United States Patent Office 3,216,997
Patented Nov. 9, 1965

3,216,997
17α-HYDROXYALDOSTERONES AND PROCESSES
FOR THEIR MANUFACTURE
Derek H. R. Barton, Northwood, Middlesex, England, assignor to Schering Corporation, Bloomfield, N.J., a corporation of New Jersey
No Drawing. Filed May 23, 1963, Ser. No. 282,562
14 Claims. (Cl. 260—239.55)

This is a continuation-in-part of applications Serial No. 113,086, filed May 29, 1961, and Serial No. 95,490, filed March 14, 1961, which, in turn, is a continuation-in-part of application Serial No. 19,444, filed April 4, 1960, now abandoned.

This invention relates to novel cyclopentanophenanthrene derivatives, to methods for their manufacture, and to novel intermediates produced thereby. More particularly, this invention relates to therapeutically active 17α-hydroxyaldosterones and derivatives thereof and to processes for their manufacture, including novel intermediates useful therein.

Included among the compounds of my invention are 17α-hydroxyaldosterone derivatives of the following structural Formula I, the 1-dehydro, 6-dehydro, and 1,6-bis-dehydro analogs thereof:

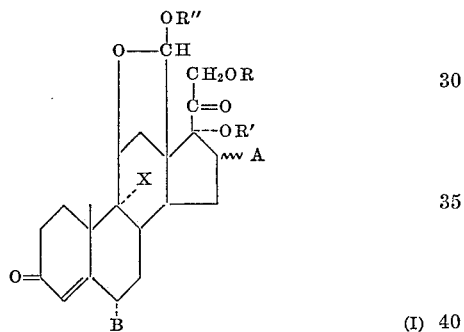

wherein A is a member selected from the group consisting of hydrogen and lower alkyl; B is a member selected from the group consisting of hydrogen, methyl, and fluorine; X is a member selected from the group consisting of hydrogen and halogen; and R, R' and R" are members selected from the group consisting of hydrogen and lower alkanoyl.

Also included in my invention are [3,2-c]-pyrazole derivatives of the compounds of Formula I and the 6-dehydro analogs thereof, particularly 1'- and 2'-substituted-[3,2-c]-pyrazoles. Preferred [3,2-c]-pyrazoles are 2'-substituted derivatives of the following Formula II and the 6-dehydro analogs thereof:

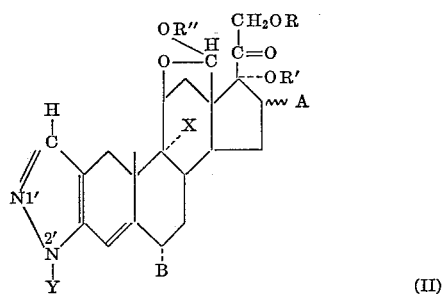

wherein A, B, X, and R, R' and R" are as defined in Formula I and Y is a member selected from the group consisting of phenyl and substituted phenyl, e.g., p-fluorophenyl.

By lower alkyl is contemplated hydrocarbon radicals having up to 4 carbon atoms, thus, including methyl, ethyl, n-propyl, isopropyl, n-butyl, sec-butyl, tert-butyl, and the like.

The lower alkanoic acid esters at C-17, 18, and 21 include hydrocarbon carboxylic acid radicals having up to 12 carbon atoms, such as acetate, propionate, valerate, t-butyl acetate, n-butyrate, enanthate, and the like.

Included among the 17α-hydroxyaldosterones of my invention are compounds such as 17α-hydroxyaldosterone and the 9α-fluoro- and 9α-bromo-derivatives thereof; 17α-hydroxy-1-dehydroaldosterone, the 9α-fluoro-, 9α-fluoro-16α-methyl-, 9α-fluoro-16β-methyl-, the 6α-methyl-, 6α-fluoro-, 6α,16α-dimethyl-, and 6α-fluoro-16α-methyl-derivatives thereof; and 17α-hydroxy-1,6-bis-dehydroaldosterone, and the 9α-fluoro- and 9α-fluoro-16α-methyl-derivatives thereof. Also included are [3,2-c]-pyrazole derivatives of 17α-hydroxyaldosterones, such as 16α-methyl-11β, 18 - oxido - 4-pregnene-17α,18,21-triol-20-one-[3,2-c]-2'-p-fluorophenylpyrazole and the 9α-fluoro-derivative thereof; 6,16α - dimethyl-11β,18-oxido-4,6-pregnadiene-17α,18, 21-triol-20-one - [3,2-c] - 2' - phenylpyrazole and the 9α-fluoro-derivative thereof; and 6,16α-dimethyl-9α-fluoro-11β,18-oxido-4,6-pregnadiene - 17α,18,21 - triol - 20 - one-[3,2-c]-2'-p-fluorophenylpyrazole.

The 17α-hydroxyaldosterones of my invention are conveniently prepared via my process preferably from the 17α,20;20,21-bis-methylenedioxy derivatives of the corresponding 11β-hydroxy-18-oximino-corticoids (III) which upon treatment with nitrous acid, are converted to the 11β,18 - oxido-18,21-mono-methylenedioxy-intermediates (IV). Treatment of the mono-methylenedioxy intermediates (IV) under acidic hydrolytic conditions, e.g., with sulfuric acid in aqueous dioxan, in the cold (preferably around 0° C.) or with acetic acid-acetic anhydride/47% hydriodic acid yields, in turn, an 11β,18;18,21-bis-oxido intermediate (V). Perchloric acid catalyzed acylation of the bis-oxido intermediate (V) will yield directly a 17,18, 21-tri-alkanoate (Ia), i.e., a 17α-hydroxyaldosterone of this invention, e.g., a composition of Formula I wherein R, R' and R" are lower alkanoyl, which upon mild alkaline hydrolysis will yield the corresponding 17α-hydroxyaldosterone (Ib) wherein R, R' and R" equal hydrogen.

A reaction scheme exemplifying my process is shown below with the C and D rings only of the steroid nucleus being shown, the A and B rings and the moieties "A," "X" and "R" may be as defined by Formulae I and II:

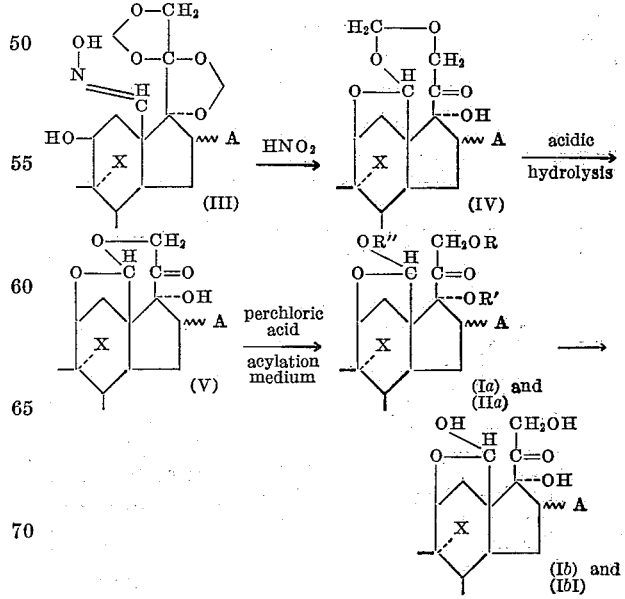

In the structural formulae in this specification, the use of a wavy line ( $\sim$ ), such as shown at C–16 in the formulae above, indicates that both the 16α- and 16β-isomers are thereby indicated.

In a typical reaction sequence exemplifying my process, the 18-oximino-17α,20;20,21-bis-methylenedioxy derivative of prednisolone (i.e., 17α,20;20,21-bis-methylenedioxy-18-oximino-1,4-pregnadiene-11β-ol-3-one) which is an intermediate of partial Formula III wherein A and X are hydrogen, is reacted with nitrous acid (i.e., acetic acid plus 5% aqueous sodium nitrite) to form 11β,18-oxido - 18,21 - mono - methylenedioxy - 1,4 - pregnadiene-17α-ol-3,20-dione (IV). Acidic hydrolysis of IV with a mineral acid in an aqueous medium such as by means of concentrated sulfuric acid in aqueous dioxan at 0° C. yields the bis-oxido intermediate (V), i.e., 11β, 18;18,21 - bis - oxido - 1,4 - pregnadiene - 17α - ol - 3, 20-dione which, in turn, upon reaction with aqueous perchloric acid in admixture with acetic acid/acetic anhydride yields the triacetate (Ia or IIa), i.e., 17α-hydroxy-1-dehydroaldosterone triacetate (i.e., 11β,18-oxido-1,4-pregnadiene-17α,18,21-triol-3,20-dione triacetate) which is convertible to the corresponding triol, 17α-hydroxy-1-dehydroaldosterone (Ib or IIb), under mild alkaline conditions, such as with dilute aqueous sodium hydroxide.

In the conversion of the bis-oxido intermediate V to an aldosterone 17,18,21-tri-ester (Ia or IIa), by substituting other alkanoic acid/anhydride mixtures, e.g., propionic acid/propionic anhydride, for acetic acid/acetic anhydride, there is obtained the corresponding tri-alkanoate, e.g., 17α-hydroxy-1-dehydroaldosterone tripropionate.

Similarly, a [3,2-c]-pyrazole-18-oximino intermediate of partial Formula III is transformable via my process to the corresponding 11→18-hemiacetal of Formula II. Thus, 16α - methyl - 17α,20;20,21 - bis - methylenedioxy-18 - oximino - 4 - pregnene - 11β - ol - [3,2 - c] - 2'-p-fluorophenylpyrazole (an intermediate of partial Formula III wherein X is hydrogen and A is α-methyl) upon reaction with nitrous acid is transformed to 16α-methyl - 11β,18 - oxido - 18,21 - mono - methylenedioxy-4 - pregnene - 17α - ol - 20 - one - [3,2 - c] - 2' - p-fluorophenylpyrazole (IV) which, upon acid hydrolysis with sulfuric acid in dioxan, yields the bis-oxido intermediate (V), 16α-methyl-11β,18;18,21-bis-oxido-4-pregnene - 17α - ol - 20 - one - [3,2 - c] - 2' - p - fluorophenylpyrazole which, in turn, upon reaction with aqueous perchloric acid yields the triacetate (IIa), i.e., 16α-methyl - 11β,18 - oxido - 4 - pregnene - 17α - ol - 20-one-[3,2-c]-2'-p-fluorophenylpyrazole triacetate, convertible to the corresponding triol under mild alkaline conditions.

In those instances wherein X is halogen, e.g., fluorine, acidic hydrolysis of the 11β,18-oxido-18,21-mono-methylenedioxy intermediate IV to the 11β,18;18,21-bis-oxido intermediate V is effected by an acetic acid-acetic anhydride-aqueous hydriodic acid mixture. Thus, for example, 9α - fluoro - 16α - methyl - 11β,18 - oxido - 18, 21 - mono - methylenedioxy - 1,4 - pregnadiene - 3,20-dione (IV) (prepared by the action of nitrous acid on 9α - fluoro - 16α - methyl - 18 - oximino - 17α,20;20, 21 - bis - methylenedioxy - 1,4 - pregnadiene - 11β - ol-3-one (III)) upon treatment with hydriodic acid in acetic acid/acetic anhydride yields 9α-fluoro-16α-methyl-11β, 18;18,21 - bis - oxido - 1,4 - pregnadiene - 17α - ol - 3, 20-dione (V).

Alternatively, in those instances when X is halogen, e.g., fluorine, the 11β,18-oxido-18,21-mono-methylenedioxy intermediate (IV), is convertible directly to a 17α, 18,21-triol (Ib or IIb) of my invention without isolation of the bis-oxido intermediate V by means of treatment with sulfuric acid in aqueous dioxan at temperatures in the range of 20–100° C., preferably about 75–80° C. Thus, for example, 9α-fluoro-11β,18-oxido-18,21-mono-methylenedioxy-4-pregnene-17α-ol-3-one (prepared by the action of nitrous acid on 9α-fluoro-18-oximino-17α, 20;20,21 - bis - methylenedioxy - 4 - pregnene - 11β-ol-3-one) upon treatment with sulfuric acid in aqueous dioxan at 75–80° C., is converted directly to 9α-fluoro-17α-hydroxyaldosterone, a compound of Formula I. In a similar manner, 9α-fluoro-11β,18-oxido-18,21-mono-methylenedioxy - 1,4 - pregnadiene - 17α - ol - 3,20-dione, upon reaction with aqueous dioxan and sulfuric acid at 75° C., is converted directly to 9α-fluoro-17α-hydroxy-1-dehydroaldosterone.

It is thus apparent from the foregoing that in the novel process described hereinabove, necessary intermediates are the 18-oximino-17α,20;20,21-bis-methylenedioxy-11β-ol-3-ones (III), the 11β,18-oxido-18,21-mono-methylenedioxy derivatives (IV), and the 11β,18;18,21-bis-oxido compounds (V).

The 1-dehydroaldosterone derivatives of Formula I, e.g., 1-dehydro-17α-hydroxyaldosterone, are prepared from the corresponding 1-dehydro corticoid, e.g., prednisolone, by my process as described hereinabove. Alternatively, Δ¹-dehydrogenation of the corresponding aldosterone (e.g., 17α-hydroxyaldosterone) by known microbiological methods utilizing organisms such as *Corynebacterium simplex* (ATCC 6946) or via chemical techniques, such as those utilizing selenium dioxide or dicyanodichloroquinone, will yield a 17α-hydroxy-1-dehydroaldosterone of my invention.

The 6-dehydro- and 1,6-bis-dehydroaldosterone derivatives of Formula I, e.g., 6-dehydro-17α-hydroxyaldosterone and 1,6-bis-dehydro-17α-hydroxyaldosterone, are prepared from the corresponding 6-dehydro- and 1,6-bis-dehydro-Δ⁴-corticoid, e.g., 6-dehydro-hydrocortisone and 1,6-bis-dehydro-hydrocortisone, by my process as exemplified in Examples 10 and 12. Alternatively, Δ⁶-dehydrogenation of the corresponding aldosterone, e.g., 17α-hydroxyaldosterone, by known procedures, such as that utilizing chloranil in refluxing xylene, or by bromination followed by dehydro-bromination in refluxing collidine will yield the 6-dehydro and 1,6-bis-dehydroaldosterones of my invention.

Similarly, the 6-dehydro analogs of the 17α-hydroxyaldosterone-[3,2-c]-pyrazoles of Formula II, are conveniently prepared from the corresponding 4,6-pregnadiene-[3,2-c]-pyrazoles by my process as described hereinabove and in Example 13 or, alternatively, a [3,2-c]-pyrazole derivative of 17α-hydroxyaldosterone, e.g., 16α - methyl - 4 - pregnene - 17α,21 - diol - 20 - one-[3,2-c]-2'-phenylpyrazole, upon treatment with chloranil in refluxing xylene according to known procedures, will yield the corresponding Δ⁶-analog of Formula II, e.g., 16α - methyl - 4,6 - pregnadiene - 17α,21 - diol - 20-one-[3,2-c]-2'-phenylpyrazole.

The 11β-hydroxy-17α,20;20,21-bis-methylenedioxy-18-oximino-4-pregnenes of Formula III, necessary intermediates in the processes of this invention, are conveniently prepared via the ultraviolet light photolysis of the 11-nitrite ester of the corresponding 11β-hydroxy-18-unsubstituted-17α,20;20,21-bis-methylenedioxy corticoid derivative utilizing procedures similar to those described in the copending U.S. applications of Derek Barton, Serial No. 95,490, filed March 14, 1961 (continuation-in-part of Serial No. 19,444, filed April 4, 1960, now abandoned) and Serial No. 113,086, filed May 29, 1961, of which the instant application is a continuation-in-part.

The 11β-hydroxy-18 - unsubstituted - 17α,20;20,21-bis-methylenedioxy-4-pregnenes having a [3,2-c]-pyrazole function, e.g., 9α-fluoro - 16α - methyl - 17α,20;20,21-bis-methylenedioxy-4-pregnene - 11β - ol - [3,2-c]-2'-p-fluorophenylpyrazole, are conveniently prepared from the corresponding Δ⁴-3-keto corticoid, e.g., 9α-fluoro-16α-methyl-hydrocortisone, via procedures known in the art. For example, 9α-fluoro-16α-methylhydrocortisone, after conversion in known manner to the corresponding 17α,20;20,-21-bis-methylenedioxy derivative, is treated with ethyl formate and sodium hydride in benzene to give the corresponding 2-hydroxymethylene derivative, e.g., 2-hydroxymethylene-9α-fluoro - 16α-methyl-17α,20;20,21-bis-methylenedioxy-4-pregnene-11β-ol-3-one, which, when refluxed with an ethanolic solution of p-fluorophenylhydrazine, yields the desired 11β-hydroxy-18-unsubstituted-[3,2-c]-pyrazole intermediate, e.g., 9α-fluoro-16α-methyl-17α,20; 20,21-bis - methylenedioxy-4-pregnene-11β-ol-[3,2-c]-2′-p-fluorophenylpyrazole. Condensation with other hydrazines, i.e., phenylhydrazine, will yield the corresponding [3,2-c]-pyrazole, e.g., 9α-fluoro - 16α - methyl-17α,20;20, 21-bis-methylenedioxy-4-pregnene-11β-ol-[3,2-c]-2′- phenylpyrazole.

Alternatively, the pyrazole function can be introduced into the 17α-hydroxyaldosterone molecule via procedures similar to those just described. Thus, 17α-hydroxyaldosterone triacetate (prepared as in Example 4) upon treatment with ethyl formate and sodium hydride followed by condensation of the resulting 2-hydroxymethylene derivative with p-fluorophenylhydrazine, for example, and subsequent mild alkaline hydrolysis of any remaining ester group will yield a [3,2-c]-pyrazole of Formula II, 11β,18-oxido-4-pregnene-17α,18,21-triol - [3,2-c]-2′-p-fluorophenylpyrazole.

In general, to prepare 18-oximino-17α,20;20,21-bis-methylenedioxy intermediates (III), a pregnane having a cortical side chain, e.g., 9α-fluoro-16α-methyl-1,4-pregnadiene-11β,17α,21-triol-3,20-dione and 9α-fluoro-16α-methyl-4-pregnene-11β,17α,21-triol-20-one - [3,2-c]-2′-p-fluorophenylpyrazole, is first converted to the corresponding bis-methylenedioxy (also written as BMD) derivative utilizing known techniques, such as with formaldehyde in chloroform and concentrated hydrochloric acid. The resulting BMD-derivative, e.g., 9α-fluoro-16α-methyl-17α,20;20, 21-bis-methylenedioxy-1,4 - pregnadiene-11β-ol-3-one and 9α-fluoro-16α-methyl-17α,20;20,21 - bis-methylenedioxy-4-pregnene-11β-ol-[3,2-c]-2′-p-fluorophenylpyrazole, is then converted to the corresponding nitrite ester by reaction with an excess of nitrosyl chloride in pyridine in the cold. Photolysis of the resultant 11-nitrite ester is then effected preferably by irradiating a toluene solution of the nitrite ester under a blanket of nitrogen at about 20° C. with ultraviolet light supplied by a Hanovia high-pressure, mercury arc lamp with a Pyrex sleeve. Isolation of the desired 18-oximino intermediate (III), e.g., 9α-fluoro-16α-methyl-17α,20;20,21-bis - methylenedioxy-18-oximino-1,4-pregnadiene-11β-ol-3-one and 9α-fluoro-16α-methyl-17α, 20;20,21-bis-methylenedioxy-18-oximino-4-pregnene-11β-ol-[3,2-c]-2′-p-fluorophenylpyrazole, is then usually effected by means of chromatographic techniques well known in the art.

The 17α-hydroxyaldosterone derivatives of Formulae I and II are preferably prepared by my process as described hereinabove whereby an 18-oximino-17α,20;20,21-bis-methylenedioxy-4-pregnene-11β-ol-3-one of Formula III is treated with nitrous acid followed by controlled acid hydrolysis of the 11β,18-oxido-18,21-mono-methylenedioxy-4-pregnene (IV) thereby formed. My invention is not to be construed as limited to the preparation of the specific compounds described herein. Any 11-hydroxy steroid also having an 18-oximino group and a 17α,20;20, 21-bis-methylenedioxy function may be converted by the preferred embodiment of my process to the corresponding 17α-hydroxyaldosterone derivative.

The process outlined hereinabove is the preferred method of preparing the compounds of Formulae I and II; however, my 17α-hydroxyaldosterone derivatives are also prepared via the nitrous acid treatment of 11β-hydroxy-18-oximino-4-pregnene corticoid intermediates having an ester function at C-21 or a ketal function at C-20, which intermediates are prepared by procedures known in the art. Thus, hydrocortisone 21-acetate 11-nitrite in toluene is photolyzed with ultraviolet light to give 18-oximino-hydrocortisone 21-acetate which, when treated with sodium nitrite in acetic acid, will yield directly 17α-hydroxy-aldosterone 21-acetate. Alternatively, the 3,2-bis-ethylene ketal derivative of hydrocortisone 11-nitrite, upon photolysis in toluene with ultraviolet light, yields the 3,20-bis-ethylene ketal of 18-oximino-hydrocortisone which, when treated with sodium nitrite in acetic acid, yields the 3,20-bis-ethylene ketal of 17α-hydroxyaldosterone 21-acetate, i.e., 3,20-bis-ethylenedioxy-11β-18-oxido-5-pregnene-17α,18,21-triol 21-acetate. Treatment with sulfuric acid in aqueous dioxan then yields a bis-oxido intermediate (V), i.e., 11β,18;18,21-bis-oxido-4-pregnene-17α-ol-3,20-dione, which is convertible to 17α-hydroxyaldosterone and the tri-lower alkanoate esters thereof by procedures described hereinabove.

By utilizing as starting compounds naturally derived compounds of absolute configuration such as are described herein, e.g., hydrocortisone, 9α-fluoro-16β-methylprednisolone, etc., my novel process advantageously prepares only the d-form of 17α-hydroxyaldosterone derivatives.

The d-17α-hydroxyaldosterone derivatives such as those of Formulae I and II are pharmaceutically active, inducing a decrease in the number of circulating eosinophils without inducing a negative nitrogen balance; in fact, sometimes promoting a positive nitrogen balance. Additionally, in sharp contrast to d-aldosterone, the substituted aldosterones of this invention show a minimum of sodium retaining properties.

In general, the substituted aldosterone derivatives such as those of Formulae I and II are valuable as anti-inflammatory agents which, since they do not induce a nitrogen loss such as occurs with the administration of corticoids such as cortisone, prednisone, dexamethasone, and the like, do not cause undesirable side effects associated with nitrogen imbalance such as purpura, osteopetrosis, and the like.

The substituted aldosterones such as those of Formulae I and II are also valuable as anabolic agents and, thus, are useful in promoting weight gain for those in debilitated states, for the relief of pain in the treatment of osteoporosis and arthritis, and in promoting tissue repair and increasing vitality to those convalescing or in geriatric states.

The preferred species of this invention are the 17α-hydroxy-1-dehydroaldosterone derivatives, and particularly, 9α-fluoro-16α-methyl-17α-hydroxy-1-dehydroaldosterone. These compounds are valuable as anti-inflammatory agents and are particularly useful in topical pharmaceutical forms for use in ailments such as *Lupus erythematosis* and other skin dermatoses, as well as in skin dermatitis and pemphigus.

The invention is described more fully in the examples which follow. These examples are set forth by way of illustration only, and it is understood that the invention is not to be construed as limited to the details contained therein as many modifications in materials and methods will be apparent from the disclosure to those skilled in the art. The invention is to be limited only by the scope of the appended claims.

*Example 1.—17α-hydroxy-1-dehydroaldosterone (11β, 18-oxido-1,4-pregnadiene-17α,18,21-triol-3,20-dione)*

A. *17α,20;20,21-bis - methylenedioxy - 1,4-pregnadiene-11β-ol-3-one 11-nitrite.*—Treat a solution of 3.8 g. of 17α,20;20,21-bis-methylenedioxy-1,4 - pregnadiene - 11β-ol-3-one in 100 ml. of pyridine at —20° C. with nitrosyl chloride gas until an orange color persists. Allow the solution to warm to room temperture, dilute with water, and extract with methylene chloride. Wash the combined extracts with water, dry over sodium sulfate, and evaporate the solvent in vacuo to a residue comprising 17α,20;20,21-bis-methylenedioxy ‑ 1,4 - pregnadiene - 11β-ol-3-one 11-nitrite. Purify by crystallization from methylene chloride-methanol. M.P. 188–190° C.

B. *17α,20;20,21 - bis - methylenedioxy - 18 - oximino-1,4-pregnadiene-11β-ol-3-one.*—By means of a Hanovia 500 watt high pressure mercury arc lamp, irradiate for 2 hours a solution of 5 g. of 17α, 20;20,21-bis-methylenedioxy-1,4-pregnadiene-11β-ol-3-one 11-nitrite in 200 ml. of toluene containing a trace of pyridine placed inside a water cooled Pyrex immersion well. Maintain slight agitation of the solution by means of a stream of pure nitrogen and keep the reaction temperature around 20° C. by regulating the temperature of the cooling water. Without further treatment, chromatograph the irradiated solution over 100 g. of alumina eluting with methylene chloride containing increasing proportions of methanol. Combine the later, like fractions and evaporate to a residue substantially of 17α,20;20,21-bis-methylenedioxy-18-oximino-1,4-pregnadiene-11β-ol-3-one. Purify by crystallization from ethyl acetate-hexane. M.P. 270–274° C.

C. *11β,18-oxido - 18,21 - mono - methylenedioxy - 1,4-pregnadiene-17α-ol-3,20-dione.*—To 1 g. of 17α,20;20,21-bis-methylenedioxy-18-oximino - 1,4 - pregnadiene - 11β-ol-3-one in 34 ml. of acetic acid at 50° C., add 24 ml. of 5% aqueous sodium nitrite. Allow the solution to stand at room temperature for 1.5 minutes (Color change: yellow-blue-green-yellow). Pour the reaction mixture into water and extract several times with methylene chloride. Wash the combined extracts with aqueous sodium bicarbonate, dry over sodium sulfate, and evaporate in vacuo to a residue of substantially 11β,18-oxido-18,21-mono - methylenedioxy - 1,4 - pregnadiene - 17α - ol - 3, 20-dione. Purify by chromatography over 20 g. of alumina with methylene chloride containing increasing portions of methanol. Evaporate the combined fractions in vacuo and crystallize the resultant residue from acetone-hexane and then from methylene dichloride-methanol. M.P. 211–216° C.

D. *11β,18;18,21 - bis - oxido - 1,4 - pregnadiene - 17α-ol - 3,20-dione.*—To 50 mg. of 11β,18-oxido-18,21-mono-methylenedioxy-1,4-pregnadiene-17α-ol-3,20-dione in 3 ml. of dioxan and 7 ml. of water at 0° C., add with stirring 0.6 ml. of concentrated sulfuric acid. Allow the solution to warm to room temperature and then heat on a steam bath under nitrogen for two hours. Add water and extract with methylene chloride. Combine the methylene chloride extracts and concentrate in vacuo to a residue of substantially 11β,18;18,21-bis-oxido-1,4-pregnadiene-17α-ol-3,20-dione. Purify by crystallizing several times from acetone-hexane. M.P. 235–244° C.

E. *11β,18 - oxido - 1,4 - pregnadiene - 17α,18,21 - triol-3,20 - dione triacetate.*—To a solution of 1 g. of 11β,18;18,21 - bis - oxido - 1,4 - pregnadiene - 17α - ol - 3, 20-dione in 100 ml. of acetic acid and 60 ml. of acetic anhydride cooled to 5° C., add dropwise with vigorous stirring 12 ml. of 70% aqueous perchloric acid. Keep the solution at 5° C. for 2 hours; then pour into ice water, neutralize with aqueous ammonia, and extract with methylene chloride. Combine the methylene chloride extracts and concentrate in vacuo to a residue of substantially 11β,18-oxido-1,4-pregnadiene-17α,18,21-triol - 3,20 - dione triacetate. Purify by crystallization from ethyl acetate-hexane. M.P. 235–240° C.

F. *11β,18 - oxido - 1,4 - pregnadiene - 17α,18,21-triol-3,20-dione.*—To a solution of 126 mg. of 11β,18-oxido-1,4-pregnadiene - 17α,18,21 - triol - 3,20 - dione triacetate in 30 ml. of methanol at 0° C. add 2.8 ml. of 0.1 aqueous sodium hydroxide and stir the solution at 0° C. under nitrogen for one hour. Dilute with 100 ml. of water containing 2 drops of acetic acid, and extract the reaction mixture several times with methylene chloride. Combine the methylene chloride extracts and evaporate in vacuo to a residue of substantially 11β,18-oxido-1,4-pregnadiene - 17α,18,21-triol-3,20-dione. Purify by crystallization from ethyl acetate-methanol. M.P. 205–210° C.

*Example 2.—9α - fluoro - 17α - hydroxyaldosterone(9α-fluoro - 11β-18-oxido-oxido - 4 - pregnene - 17α,18,21-triol-3,20-dione)*

A. *9α - fluoro - 17α,20;20,21 - bis - methylenedioxy - 4-pregnene - 11β - ol - 3 - one 11 - nitrite.*—Treat 25 g. of 9α - fluoro - 17α,20;20,21 - bis - methylenedioxy - 4 - pregnene-11β-ol-3-one in pyridine with nitrosyl chloride in a manner similar to that decribed in Example 1A. Isolate the resultant product in the described manner to give 9α-fluoro-17α,20;20,21-bis - methylenedioxy - 4 - pregnene-11β-ol-3-one 11-nitrite.

B. *9α-fluoro - 18 - oximino - 17α,20;20,21 - bis - methylenedioxy - 4 - pregnene - 11β - ol - 3 - one.*—In a manner similar to that described in Example 1B, irradiate a solution of 9α-fluoro-17α,20;20,21-bis-methylenedioxy-4-pregnene-11β-ol-3-one 11-nitrite (prepared in Example 2A) in 1.3 l. of toluene containing a trace of pyridine for 1.5 hours at 5–10° C. under nitrogen using a 500 watt Hanovia lamp. Chromatograph the irradiated solution over Florisil eluting with (4:5) benzene-methylene chloride. Combine the eluates and evaporate in vacuo to a residue of substantially 9α-fluoro-18-oximino-17α, 20;20,21-bis-methylenedioxy-4-pregnene - 11β - ol - 3-one. Use without further purification in the following procedure 2 C.

C. *9α-fluoro-11β,18-oxido-18,21-mono-methylenedioxy-4-pregnene-17α-ol-3,20-dione.*—To 2.5 g. of 9α-fluoro-18-oximino - 17α,20;20,21 - bis-methylenedioxy - 4-pregnene-11β-ol-3-one in 200 ml. of 75% aqueous acetic acid at −2° C., add 25 ml. of water containing 3.75 g. of sodium nitrite. Allow the solution to stand at room temperature for 20 minutes; then extract with methylene chloride. Evaporate the combined methylene chloride extracts to a residue and chromatograph the residue over Florisil in methylene chloride. Concentrate the combined eluates to a residue of substantially 9α-fluoro-11β,18-oxido-18,21-mono-methylenedioxy-4-pregnene-17α-ol-3,20-dione. Purify by crystallization from ethyl acetate-hexane. M.P. 234–260° C. After several recrystallizations M.P. 252–265° C.

D. *9α-fluoro-11β,18-oxido-4-pregnene-17α,18,21-triol-3, 20-dione.*—Heat in a stream of nitrogen for one hour at 75–80° C. a solution of 140 mg. of 9α-fluoro-11β,18-oxido - 18,21-mono-methylenedioxy-4-pregnene-17α-ol-3, 20-dione in 9 ml. of dioxan and 20 ml. of water containing 1.8 ml. of concentrated sulfuric acid. Dilute with water and extract with methylene chloride. Evaporate the combined extracts to a residue substantially of 9α-fluoro-11β,18-oxido-4-pregnene-17α,18,21-triol - 3,20 - dione. Purify by crystallization from ethyl acetate-methanol. M.P. 210–218° C.

*Example 3.—9α - fluoro - 17α-hydroxy-1-dehydroaldosterone(9α - fluoro - 11β,18-oxido-1,4-pregnadiene-17α,18, 21-triol-3,20-dione)*

A. *9α-fluoro-11β,18-oxido-18,21-mono-methylenedioxy-1,4-pregnadiene-17α-ol-3,20-dione.*—To a solution of 2 g. of 9α-fluoro-11β,18-oxido-18,21-mono-methylenedioxy-4-pregnene-17α-ol-3,20-dione (the compound of Example 2C) in 100 ml. of butanol containing 0.24 ml. of pyridine, add 810 mg. of selenium dioxide. Reflux under nitrogen for 72 hours. Distill the solvent in vacuo, dissolve the resultant residue in methylene chloride, and filter through Supercel. Wash the filtered solution with aqueous sodium bicarbonate, ammonium sulphide, 2 N aqueous ammonia, water and, finally, saturated sodium chloride solution. Chromatograph the washed methylene chloride solution over 50 g. of alumina, utilizing methylene chloride containing increasing amounts of methanol. Combine like fractions and concentrate in vacuo to a residue of substantially 9α-fluoro-11β,18-oxido-18,21-mono-methylenedioxy-1,4-pregnadiene-17α-ol-3,20-dione. Purify by further chromatography and crystallization from ethyl acetate-hexane. M.P. 239–253° C.

B. *9α - fluoro-11β,18-oxido-1,4-pregnadiene-17α,18,21-triol-3,20-dione.*—Heat a solution of 180 mg. of 9α-fluoro-11β,18 - oxido - 18,21-mono-methylenedioxy-1,4-pregnadiene-17α-ol-3,20-dione in 9 ml. of dioxan and 20 ml. of water containing 1.8 ml. of concentrated sulfuric acid under an atmosphere of nitrogen at 80° C. for 1.8 hours.

Dilute with water and extract with methylene chloride. Evaporate the combined extracts to a residue of substantially 9α - fluoro-11β,18-oxido-1,4-pregnadiene-17α,18,21-triol-3,20-dione. Purify by crystallization from acetone-methanol. M.P. 203–216° C. After several recrystallizations, M.P. 205–213° C.

*Example 4.—17α - hydroxyaldosterone(11β,18 - oxido-4-pregnene-17α,18,21-triol-3,20-dione)*

A. *17α,20;20,21-bis-methylenedioxy-4-pregnene-11β-ol-3-one.*—To 100 g. of finely powdered hydrocortisone (4-pregnene-11β,17α,21-triol-3,20-dione) suspended in 4 l. of chloroform and 1 l. of 37% formaldehyde, add at room temperature with stirring 1 l. of concentrated hydrochloric acid. Stir for about 40 minutes; then separate the layers. Wash the chloroform layer with water, dry over sodium sulfate and chomatograph over 2 kg. of alumina, eluting with methylene chloride containing increasing amounts of methanol. Combine the early, like fractions and evaporate to a residue of substantially 17α,20;20,21-bis-methylene-dioxy-4-pregnene-11β-ol-3-one. Purify by crystallization from ethyl acetate. Combine the like, late fractions and evaporate in vacuo to a residue and crystallize several times from ethyl acetate to obtain 11β-(hydroxymethylene)oxy - 17α,20;20,21 - bis-methylenedioxy-4-pregnene-3-one. Conversion of this compound to the compound of this example, i.e., 17α,20;20,21-bis-methylenedioxy-4-pregnene-11β,ol-3-one, is effected either by refluxing the 11β-(hydroxymethylene)oxy derivative in acetic acid under nitrogen for 5 minutes or by heating it at 200° C. in an open tube for about 2 minutes, during which time the compound melts with effervescence and then resolidifies.

B. *17α,20;20,21-bis-methylenedioxy-4-pregnene-11β-ol-3-one 11-nitrite.*—Treat 27.5 g. of 17α,20;20,21-bis-methylenedioxy-4-pregnene-11β-ol-3-one in 200 ml. of pyridine at room temperature with nitrosyl chloride gas until an orange color persists. Cautiously dilute with water; filter the resultant precipitate substantially of 17α,20;20,21-bis - methylenedioxy - 4-pregnene-11β-ol-3-one 11-nitrite. Purify by crystallization from methylene chloride-hexane. M.P. 170–172° C.

C. *17α,20;20,21-bis-methylenedioxy-18-oximino-4-pregnene-11β-ol-3-one.*—In a manner similar to that described in Example 1B, irradiate a solution of 6.4 g. of 17α,20;20,21-bis-methylenedioxy-4-pregnene-11β-ol-3-one in 200 ml. of toluene at 5° C. for 90 minutes. Allow the irradiated solution to stand overnight at 5° C.; then chromatograph over 200 g. of alumina, eluting with methylene chloride containing increasing portions of methanol. Combine the like, late fractions and concentrate to a residue of substantially of 17α,20;20,21 - bis-methylenedioxy-18-oximino-4-pregnene-11β-ol-3-one. Purify by crystallization from ethyl acetate. M.P. 220–229° C.

D. *11β,18 - oxido - 18,21 - mono - methylenedioxy - 4-pregnene-17α-ol-3,20-dione.*—In a manner similar to that described in Example 1C, treat 6.33 g. of 17α,20;20,21-bis - methylenedioxy - 18 - oximino-4-pregnene-11β-ol-3-one in 180 ml. of acetic acid with 60 ml. of 5% aqueous sodium nitrate (color change: blue-green-yellow). Isolate the resultant product in the described manner to obtain 11β,18-oxido-18,21-mono-methylenedioxy-4-pregnene-17α-ol-3,20-dione. Purify by chromatography over 380 g. of alumina, eluting with methylene chloride containing increasing portions of methanol. Combine the eluates containing up to 1% methanol and evaporate in vacuo to a residue. Crystallize the residue from ethyl acetate. M.P. 194-216° C. After several recrystallizations from ethyl acetate-hexane, M.P. 220–236° C.

E. *11β,18;18,21 - bis - oxido - 4 - pregnene - 17α - ol-3,20-dione.*—In a manner similar to that described in Example 1D, to 500 mg. of 11β,18-oxido-18,21-mono-methylenedioxy-4-pregnene-17α-ol-3,20-dione in 6 ml. of dioxane and 14 ml. of water at 0° C. under a blanket of nitrogen, add 1.2 ml. of concentrated sulfuric acid and heat on a steam bath for 90 minutes. Add water and extract with methylene chloride. Combine the methylene chloride extracts and concentrate in vacuo to a residue of substantially 11α,18;18,21 - bis - oxido - 4 - pregnene-17α-ol-3,20-dione. Purify by crystallization from ethyl acetate. M.P. 201–210° C.

F. *11β,18 - oxido - 4 - pregnene - 17α,18,21 - triol - 3, 20-dione triacetate.*—To 880 mg. of 11β, 18;18,21-bis-oxido-4-pregnene-17α-ol-3,20-dione in 92 ml. of glacial acetic acid and 8.75 ml. of acetic anhydride together with 1.05 ml. of ethyl acetate at 13° C. with stirring, add dropwise over a five-minute interval 0.78 ml. of 70% perchloric acid. Continue stirring for 55 minutes at 14–15° C. Pour the solution rapidly onto 1400 ml. of ice water containing 95 ml. of 10 N ammonium hydroxide. Allow the reaction mixture to stand for 20 minutes, filter the suspension, and discard the solid. Extract the filtrate with methylene chloride and evaporate the combined extracts in vacuo to a residue of substantially 11β,18-oxido-4-pregnene-17α,18,21-triol-3,20-dione triacetate. Purify by several crystallizations from acetone-hexane. M.P. 114–124° C.

G. *11β,18 - oxido - 4 - pregnene - 17α,18,21 - triol - 3, 20-dione.*—In a manner similar to that described in Example 1F, treat 602 mg. of 11β,18-oxido-4-pregnene-17α, 18,21-triol-3,20-dione triacetate in methanol at 0° C. under nitrogen with 13.2 ml. of 0.1 N aqueous sodium hydroxide. Isolate the resultant product in the described manner to obtain 11β,18-oxido-4-pregnene-17α,18,21-triol-3,20-dione. Purify by several crystallizations from methanol. M.P. 215–220° C.

The compound of this example, i.e., 11β,18-oxido-4-pregnene-17α,18,21-triol-3,20-dione triacetate, in tertiary-butanol containing pyridine, upon treatment with selenium dioxide in a manner similar to that described in Example 3A, is converted to the corresponding 1-dehydro analog, i.e., 11β,18-oxido-1,4-pregnadiene-17α,18,21-triol-3,20-dione triacetate (the compound of Example 1E).

*Example 5.—9α - fluoro - 16α - methyl - 1 - dehydroaldosterone(9α - fluoro - 11β,18 - oxido - 16α - methyl-1,4 - pregnadiene - 17α,18,21 - triol - 3,20 - dione)*

A. *9α - fluoro - 16α - methyl - 17α,20:20,21 - bis - methylenedioxy - 1,4 - pregnadiene - 11β - ol - 3 - one 11-nitrite.*—In a manner similar to that described in Example 1A, treat 17.5 g. of 9α-fluoro-16α-methyl-17α,20; 20,21 - bis-methylene-dioxy - 1,4 - pregnadiene-11β-ol-3-one in pyridine with nitrosyl chloride at room temperature. Isolate the resultant product in the described manner to obtain 9α-fluoro-16α-methyl-17α,20;20,21-bis-methylenedioxy-1,4-pregnadiene-11β-ol-3-one 11-nitrite. This product is used without further purification in procedure 5B immediately following.

B. *9α - fluoro - 16α - methyl - 18 - oximino - 17α,20;20, 21 - bis - methylenedioxy - 1,4 - pregnadiene - 11β - ol-3-one.*—Dissolve the 9α-fluoro-16α-methyl-17α,20;20,21-bis -methylenedioxy - 1,4 - pregnadiene - 11β - ol - 3 - one 11-nitrite prepared in Example 5A in 650 ml. of toluene containing a trace of pyridine and photolyze at 25° C. under nitrogen for 2.6 hours in the manner of Example 1B. Isolate the resultant product in the described manner to obtain 9α-fluoro-16α-methyl-18-oximino-17α,'20; 20,21 - bis - methylenedioxy - 1,4 - pregnadiene - 11β - ol-3-one. Purify by crystallization from acetone-hexane. M.P. 288–297° C.

C. *9α - fluoro - 16α - methyl - 11β,18 - oxido - 18,21-mono - methylenedioxy - 1,4 - pregnadiene - 17α - ol - 3, 20-dione.*—In a manner similar to that described in Example 1C, to a solution of 2 g. of 9α-fluoro-16α-methyl-18 - oximino - 17α,20;20,21 - bis - methylenedioxy - 1,4-pregnadiene-11β-ol-3-one in 150 ml. of glacial acetic acid and 50 ml. of water at −2° C., add 3.75 g. of sodium nitrite in 25 ml. of water over a period of 15 minutes allowing the solution temperature to rise to room temperature. Isolate the resultant product in the described manner to obtain 9α - fluoro - 16α - methyl - 11β,18-oxido - 18,21 - mono - methylenedioxy - 1,4 - pregnadiene-17α-ol-3,20-dione. Purify by chromatography over 50 g. of Florisil, eluting with methylene chloride containing increasing portions of methanol. Combine like fractions and evaporate to a residue. Recrystallize the residue from ethyl acetate. M.P. 243–260° C.

D. *9α - fluoro - 16α - methyl - 11β,18;18,21 - bis-oxido-1,4 - pregnadiene - 17α - ol - 3,20 - dione.*—To 1.55 g. of 9α - fluoro - 16α - methyl - 11β,18 - oxido - 18,20 - mono-methylenedioxy-1,4-pregnadiene-17α-ol-3,20-dione in 60 ml. of glacial acetic acid and 16 ml. of acetic anhydride at 20° C. under nitrogen, add with stirring 4 ml. of 47% aqueous hydriodic acid. Continue stirring at room temperature for 15 minutes, dilute with 2% aqueous sodium thiosulfate and extract with methylene chloride. Combine the methylene chloride extracts, wash with water, and concentrate in vacuo to a residue. Dissolve this residue in 120 ml. of methanol, add 12 ml. of water and 12 ml. of 10% aqueous potassium carbonate, and keep at room temperature under nitrogen for 40 minutes. Distill the methanol in vacuo and extract the reaction mixture with methylene chloride. Chromatograph the methylene chloride solution over alumina, eluting with methylene chloride containing increasing portions of methanol. Combine the like fractions and evaporate to a residue of substantially 9α-fluoro-16α-methyl-11β,18;18,21-bis-oxido-1,4-pregnadiene-17α-ol-3,20-dione. Purify by several crystallizations from acetone-hexane. M.P. 267-280° C.

E. *9α - fluoro - 11β,18 - oxido - 16α - methyl - 1,4-pregnadiene - 17α,18,21 - triol - 3,20 - dione triacetate.*—In a manner similar to that described in Example 1E, treat 2.3 g. of 9α-fluoro-16α-methyl-11β,18;18,21-bis-oxido-1,4-pregnadiene-17α-ol-3,20-dione in 240 ml. of acetic acid and 150 ml. of acetic anhydride at room temperature with stirring with 3 ml. of 70% aqueous perchloric acid. Continue stirring for 2.8 hours. Pour the solution into ice water containing 390 ml. of concentrated aqueous ammonia. Isolate by extraction with methylene chloride in the described manner and purify by crystallization from acetone-hexane to give 9α-fluoro-11β,18-oxido-16α - methyl 1,4 - pregnadiene - 17α,18,21 - triol - 3,20-dione triacetate. M.P. 258–269° C.

F. *9α - fluoro-11β,18 - oxido-16α - methyl - 1,4 - pregnadiene-17α,18,21-triol-3,20-dione.*—In a manner similar to that described in Example 1F, stir for 45 minutes at 0° C. under nitrogen a solution of 500 mg. of 9α-fluoro-11β,18 - oxido - 16α - methyl - 1,4 - pregnadiene - 17α, 18,21-triol-3,20-dione triacetate in 105 ml. of methanol with 13.8 ml. of 0.1 N aqueous sodium hydroxide. Continue stirring for 45 minutes and isolate the resultant product in the described manner to give 9α-fluoro-11β,18-oxido - 16α - methyl - 1,4 - pregnadiene - 17α,18,21 - triol-3,20-dione. Purify by several crystallizations from acetone-hexane-methanol. M.P. 256–265° C.

*Example 6.—9α-bromo-17α,20;20,21-bis-methylenedioxy-4-pregnene-11β-ol-3-one*

A. *17α,20;20,21 - bis - methylenedioxy - 4 - pregnene-11α-ol-3-one.*—To 200 g. of 4-pregnene-11α,17α,21-triol-3,20-dione in 7 l. of chloroform, add a mixture of 1.7 l. of 37% formaldehyde and 1.7 l. of 12 N hydrochloric acid and stir the mixture for one hour. Separate the layers and wash the inorganic layer with chloroform. Wash the combined chloroform extracts with a saturated solution of sodium bicarbonate, dry over sodium sulfate, and chromatograph over alumina, eluting with methylene chloride containing increasing amounts of methanol. Combine the like, early fractions and concentrate in vacuo to a residue of substantially 17α,20;20,21-bis-methylenedioxy-4-pregnene-11α-ol-3-one. Purify by crystallization from chloroform-ethyl acetate. M.P. 241–246° C.

B. *17α,20;20,21 - bis - methylenedioxy - 4,9(11) - pregnadiene-3-one.*—To 38.5 g. of 17α,20;20,21-bis-methylenedioxy-4-pregnene-11α-ol-3-one in 250 ml. of pyridine, add 33 g. of p-toluene-sulfonyl chloride and stir at room temperature for 64 hours. Dilute with 3 l. of water and add hydrochloric acid until the reaction solution is at pH 2 or lower. Filter the resultant precipitate, wash with water, and dry at 60° C. in vacuo; then dissolve in 900 ml. of glacial acetic acid containing 36 g. of sodium acetate. Reflux the reaction mixture for 2.75 hours; then pour onto 2.5 l. of slurried ice containing 1040 ml. of 10 N ammonium hydroxide. Filter the resultant precipitate of substantially 17α,20;20,21-bis-methylenedioxy - 4,9(11) - pregnadiene - 3 - one. Purify by crystallization from acetone-hexane. M.P. 216–220° C.

C. *9α - bromo - 17α,20;20,21 - bis - methylenedioxy-4-pregnene-11β-ol-3-one.*—To 18 g. of 17α,20;20,21-bis-methylenedioxy-4,9(11)-pregnadiene-3-one in 260 ml. of freshly purified dioxan containing 12 ml. of 0.5 N aqueous perchloric acid, add with stirring 5 g. of N-bromoacetamide. Continue stirring and at 15 minute intervals add 2 further portions of 5 g. of N-bromoacetamide (total—15 g.). Stir for one hour longer; then add 220 ml. of 10% aqueous sodium sulfite. Filter the resultant precipitate of substantially 9α-bromo-17α,20;20,21-bis-methylenedioxy - 4 - pregnene - 11β - ol - 3 - one. Purify by crystallization from ethyl acetate-methylene chloride-hexane. M.P. 178° C. dec.

*Example 7. — 9α - bromo - 17α - hydroxyaldosterone (9α - bromo - 11β,18 - oxido - 4 - pregnene - 17α,18,21-triol-3,20-dione)*

A. *9α - bromo - 17α,20;20,21 - bis - methylenedioxy-4-pregnene-11β-ol-3-one-11-nitrite.*—In a manner similar to that described in Example 1A, treat 8 g. of 9α-bromo-17α,20;20,21-bis-methylenedioxy - 4 - pregnene - 11β - ol-3-one in 180 ml. of pyridine with an excess of nitrosyl chloride at room temperature. Dilute the reaction mixture with ice and water and filter the resultant precipitate of substantially 9α - bromo - 17α,20;20,21 - bis - methylenedioxy - 4 - pregnene - 11β - ol - 3 - one 11 - nitrite, which is used without further purification in the following procedure 7B.

B. *9α - bromo - 17α,20;20,21 - bis - methylenedioxy-18 - oximino - 4 - pregnene - 11β - ol - 3 - one.*—Dissolve the 9α - bromo - 17α,20;20,21 - bis - methylenedioxy - 4-pregnene-11β-ol-3-one 11-nitrite prepared in Example 7A in 650 ml. of toluene containing 0.1 ml. of pyridine. Photolyze the solution for one hour at 0° C. under nitrogen in the manner of Example 1B. Dilute the irradiated solution with 2 l. of methylene chloride and chromatograph over 300 g. of Florisil, eluting with methylene chloride containing increasing portions of methanol. The fraction eluted with methylene chloride containing 2% methanol is evaporated to a residue of substantially 9α-bromo-17α,20;20,21-bis-methylenedioxy-18 - oximino - 4 - pregnene - 11β - ol - 3 - one. Purify by crystallization from acetone-hexane. M.P. 170° C. dec.

C. *9α - bromo - 11β,18 - oxido - 18,21 - mono - methylenedioxy - 4 - pregnene - 17α - ol - 3,20 - dione.*—In a manner similar to that described in Example 1C, treat 950 mg. of 9α-bromo-17α,20;20,21-bis-methylenedioxy-18-oximino-4-pregnene-11β-ol-3-one in 70 ml. of glacial acetic acid and 15 ml. of water with 1.75 g. of sodium nitrite in 20 ml. of water at 0° C. for 25 minutes. Dilute the reaction mixture with 400 ml. of water containing 70 ml. of concentrated aqueous ammonia. Extract with methylene chloride and evaporate the combined extracts in vacuo to a residue. Chromatograph the residue over Florisil, eluting with methylene chloride containing increasing amounts of methanol. Combine the like, early fractions and evaporate in vacuo to a residue of substantially 9α - bromo - 11β,18 - oxido - 18,21 - mono-methylenedioxy - 4 - pregnene - 17α - ol - 3,20 - dione.

Purify by crystallization from acetone-hexane. M.P. 180° C. dec.

Combine the like, late fractions and evaporate in vacuo to a residue of substantially 9α-bromo-11β,18-oxido - 18 - oximino - 17α,20;20,21 - bis - methylenedioxy-4-pregnene-3-one. Purify by crystallization from acetone-hexane. M.P. 340° C. dec.

D. *9α - bromo - 11β,18 - oxido - 4 - pregnene - 17α, 18,21-triol-3,20-dione.*—In a manner similar to that described in Example 2D, treat at 75–80° C. a solution of 9α - bromo - 11β,18 - oxido - 18,21 - monomethylenedioxy-4-pregnene-17α-ol-3,20-dione in aqueous dioxan with concentrated sulfuric acid. Isolate and purify the resultant product in the described manner to give 9α-bromo-11β,18 - oxido - 4 - pregnene - 17α,18,21 - triol - 3,20-dione.

*Example 8.—9α - fluoro - 16β - methyl - 1 - dehydroaldosterone(9α - fluoro - 11β,18 - oxido - 16β - methyl - 1,4-pregnadiene - 17α,18,21 - triol - 3,20 - dione)*

A. *9α - fluoro - 16β - methyl - 17α,20;20,21-bis-methylenedioxy - 1,4 - pregnadiene - 11β - ol - 3 - one.*—In a manner similar to that described in Example 4A, treat 9α - fluoro - 16β - methyl - 1,4 - pregnadiene - 11β,17α,21-triol - 3,20 - dione in chloroform with 37% formaldehyde and hydrochloric acid and isolate and purify the resultant product to give 9α - fluoro - 16β - methyl - 17α,20;20,21-bis - methylenedioxy - 1,4 - pregnadiene - 11β - ol-3-one.

B. *9α - fluoro - 16β - methyl - 17α,20;21 - bis - methylenedioxy - 1,4 - pregnadiene - 11β - ol - 3-one 11-nitrite.*—In a manner similar to that described in Example 5A, esterify 9α - fluoro - 16β - methyl - 17α,20;20,21 - bis-methylenedioxy - 1,4 - pregnadiene - 11β - ol - 3 - one with nitrosyl chloride in pyridine and isolate the resultant product to give 9α - fluoro - 16β - methyl - 17α,20;20,21-bis-methylenedioxy - 1,4 - pregnadiene - 11β - ol - 3 - one 11-nitrite.

C. *9α - fluoro - 16β - methyl - 17α,20;20,21-bis-methylenedioxy - 18 - oximino - 1,4 -pregnadiene 11β-ol-3-one.*—In a manner similar to that described in Example 5B, irradiate a solution of 9α-fluoro-16β-methyl-17α,20;20,21-bis - methylenedioxy - 1,4 - pregnadiene - 11β - ol - 3-one 11-nitrite in toluene containing a trace of pyridine by means of a Hanovia 500 watt high-pressure mercury arc lamp under nitrogen and isolate and purify the resultant product in the described manner to give 9α - fluoro - 16β-methyl - 17α,20;20,21 - bis - methylenedioxy-18-oximino-1,4-pregnadiene-11β-ol-3-one.

D. *9α - fluoro - 16β - methyl - 11β,18 - oxido - 18,21-mono - methylenedioxy - 1,4 - pregnadiene - 17α-ol-3,20-dione.*—In a manner similar to that described in Example 5C, treat a solution of 9α-fluoro-16β-methyl-17α,20;20,21-bis - methylenedioxy - 18 - oximino - 1,4 - pregnadiene-11β - ol - 3 - one in acetic acid with sodium nitrite at −2° C. Isolate and purify the resultant product in the described manner to give 9α - fluoro - 16β - methyl-11β,18-oxido - 18,21 - mono - methylenedioxy - 1,4 - pregnadiene-17α-ol-3,20-dione.

E. *9α-fluoro - 16β - methyl - 11β,18;18,21 - bis - oxido-1,4 - pregnadiene - 17α - ol - 3,20 - dione.*—In a manner similar to that described in Example 5D, treat a solution of 9α - fluoro - 16β - methyl - 11β,18 - oxido - 18,21-mono-methylenedioxy - 1,4 - pregnadiene - 17α - ol-3,20-dione in acetic acid/acetic anhydride at −20° C. with 47% aqueous hydriodic acid. Isolate and purify the resultant product in the described manner to give 9α - fluoro - 16β-methyl - 11β,18;18,21 - bis - oxido - 1,4 - pregnadiene-17α-ol-3,20-dione.

F. *9α - fluoro - 16β - methyl - 11β,18 - oxido - 1,4-pregnadiene - 17α,18,21 - triol - 3,20 - dione triacetate.*—In a manner similar to that described in Example 5E, treat a solution of 9α - fluoro - 16β - methyl-11β,18;18,21-bis - oxido - 1,4 - pregnadiene - 17α - ol - 3,20 - dione in acetic acid/acetic anhydride at 5° C. with 70% aqueous perchloric acid. Isolate and purify the resultant product in the described manner to give 9α - fluoro - 16β - methyl-11β,18 - oxido - 1,4 - pregnadiene - 17α,18,21-triol-3,20-dione triacetate.

G. *9α - fluoro - 16β - methyl - 11β,18 - oxido - 1,4-pregnadiene - 17α,18,21 - triol - 3,20 - dione.*—In a manner similar to that described in Example 5F, treat the triacetate of Example 8F with methanolic sodium hydroxide at 0° C. Isolate and purify the resultant product in the manner described to give 9α - fluoro - 16β - methyl-11β,18 - oxido - 1,4 - pregnadiene - 17α,18,21 - triol-3,20-dione.

*Example 9.—6-substituted-1-dehydroaldosterones*

A. *6 - substituted - 17α,20;21 - bis - methylenedioxy-1,4 - pregnadiene - 11β - ol - 3-ones.*—In a manner similar to that described in Example 4A, treat each of 6α - methyl-1,4 - pregnadiene - 11β,17α,21 - triol - 3,20 - dione, 6α-fluoro - 1,4 - pregnadiene - 11β,17α,21 - triol - 3,20-dione, 6α,16α - dimethyl - 1,4 - pregnadiene - 11β,17α,21 - triol-3,20 - dione, and 6α - fluoro - 16α - methyl - 1,4 - pregnadiene - 11β,17α,21 - triol - 3,20 - dione in chloroform with 37% formaldehyde and hydrochloric acid. Isolate the respective resultant products in the described manner to give 6α - methyl - 17α,20;20,21 - bis - methylenedioxy-1,4 - pregnadiene - 11β - ol - 3 - one, 6α-fluoro-17α,20;20,21 - bis - methylenedioxy - 1,4 - pregnadiene - 11β-ol-3-one, 6α,16α - dimethyl - 17α,20;20,21 - bis - methylenedioxy - 1,4 - pregnadiene - 11β - ol - 3 - one, and 6α-fluoro-16α - methyl - 17α,20;20,21 - bis - methylenedioxy - 1,4-pregnadiene-11β-ol-3-one, respectively.

B. *6 - substituted - 17α,20;20,21 - bis - methylenedioxy-1,4 - pregnadiene - 11β - ol - 3 - one 11-nitrite esters.*—In a manner similar to that described in Example 1A, esterify each of the 11β - hydroxy - 17α,20;20,21 - bis - methylenedioxy - 1,4 - pregnadiene prepared in the preceding example with nitrosyl chloride in pyridine at −20° C. Isolate and purify the resultant respective products in the described manner to give 6α - methyl - 17α,20;20,21-bis-methylenedioxy - 1,4 - pregnadiene - 11β - ol - 3 - one 11-nitrite, 6α - fluoro - 17α,20;20,21-bis-methylenedioxy-1,4 - pregnadiene - 11β - ol - 3 - one 11-nitrite, 6α,16α-dimethyl - 17α,20;20,21 - bis - methylenedioxy - 1,4-pregnadiene - 11β - ol - 3 - one 11-nitrite, and 6α-fluoro-16α - methyl - 17α,20;20,21 - bis - methylenedioxy - 1,4-pregnadiene - 11β - ol - 3 - one 11-nitrite, respectively.

C. *6 - substituted - 17α,20;20,21 - bis - methylenedioxy-18 - oximino - 1,4 - pregnadiene - 11β - ol - 3 - ones.*—In a manner similar to that described in Example 1B, irradiate a toluene solution of each of the 11-nitrite esters prepared in the preceding example by means of a Hanovia 500 watt high pressure mercury lamp. Isolate and purify the resultant respective products in the manner described to give 6α - methyl - 17α,20;20,21 - bis - methylenedioxy-18 - oximino - 1,4 - pregnadiene - 11β - ol - 3 - one, 6α-fluoro - 17α,20;20,21 - bis - methylenedioxy - 18-oximino-1,4 - pregnadiene - 11β - ol - 3 - one, 6α,16α - dimethyl-17α,20;20,21 - bis - methylenedioxy - 18 - oximino - 1,4-pregnadiene - 11β - ol - 3 - one, and 6α - fluoro - 16α-methyl - 17α,20;20,21 - bis methylenedioxy 18 - oximino-1,4-pregnadiene-11β-ol-3-one, respectively.

D. *6 - substituted-11β,18-oxido-18,21-mono-methylenedioxy-1,4-pregnadiene-17α-ol-3,20-diones.*—In a manner similar to that described in Example 1C, treat an acetic acid solution of each of the 18-oximino derivatives prepared in Example 9C with 5% aqueous sodium nitrite. Isolate and purify the respective resultant products in the described manner to give 6α-methyl-11β,18-oxido-18,21-mono-methylenedioxy - 1,4 - pregnadiene - 17α - ol-3,20-dione, 6α-fluoro-11β,18-oxido - 18,21 - mono - methylenedioxy-1,4-pregnadiene-17α-ol-3,20-dione, 6α,16α-dimethyl-11β,18-oxido - 18,21 - mono-methylenedioxy-1,4-pregnadiene-17α-ol-3,20-dione, and 6α-fluoro-16α-methyl-11β,18-oxido - 18,21 - mono - methylenedioxy - 1,4-pregnadiene-17α-ol-3,20-dione.

E. *6 - substituted - 11β,18;18,21 - bis-oxido-1,4-pregnadiene-17α-ol-3,20-dione.*—In a manner similar to that described in Example 1D, treat an aqueous solution of each of the 18,21-mono-methylenedioxy derivatives prepared in Example 9D with concentrated sulfuric acid at 0° C. Isolate and purify the respective resultant products in the manner described to give 6α-methyl-11β,18;18,21-bis-oxido-1,4-pregnadiene-17α-ol-3,20-dione, 6α - fluoro - 11β, 18;18,21-bis-oxido-1,4-pregnadiene-17α-ol-3,20-dione, 6α, 16α-dimethyl-11β,18;18,21-bis - oxido - 1,4 - pregnadiene-17α-ol-3,20-dione and 6α-fluoro-16α-methyl-11β,18;18,21-bis-oxido-1,4-pregnadiene-17α-ol-3,20-dione, respectively.

F. *6-substituted-17α-hydroxy-1-dehydroaldosterone triacetate esters.*—In a manner similar to that described in Example 1E, treat an acetic acid/acetic anhydride solution of each of the 11β,18;18,21-bis-oxido derivatives prepared in Example 9E with 70% aqueous perchloric acid at 5° C. Isolate and purify the respective resultant products in the manner described to give 6α-methyl-11β,18-oxido-1,4-pregnadiene - 17α,18,21 - triol - 3,20 - dione triacetate, 6α-fluoro - 11β,18 - oxido - 1,4-pregnadiene-17α,18,21-triol-3,20-dione triacetate, 6α,16α-dimethyl-11β,18-oxido-1,4-pregnadiene-17α,18,21-triol-3,20-dione triacetate, and 6α-fluoro - 16α - methyl - 11β,18-oxido-1,4-pregnadiene-17α,18,21-triol-3,20-dione triacetate, respectively.

G. *6-substituted-17α-hydroxy-1-dehydroaldosterones.*—In a manner similar to that described in Example 1F, hydrolyze each of the 17α-hydroxy-1-dehydroaldosterone triacetate esters prepared in Example 9F with aqueous methanolic sodium hydroxide at 0° C. Isolate and purify the resultant respective products in the manner described to give 6α-methyl-11β,18-oxido-1,4-pregnadiene-17α,18,21-triol-3,20-dione, 6α - fluoro - 11β,18-oxido-1,4-pregnadiene-17α,18,21-triol-3,20-dione, 6α,16α-dimethyl-11β,18-oxido-1,4-pregnadiene-17α,18,21-triol-3,20-dione, and 6α-fluoro - 16α-methyl-11β,18-oxido-1,4-pregnadiene-17α,18,21-triol-3,20-dione, respectively.

*Example 10.—1,6-bis-dehydro-17α-hydroxyaldosterones*

A. *17α,20;20,21 - bis-methylenedioxy-18-oximino-1,4,6-pregnatriene-11β-ol-3-ones.*—In a manner similar to that described in Example 4A, treat each of 1,4,6-pregnatriene-11β,17α,21-triol-3,20-dione, 9α - fluoro-1,4,6-pregnatriene-11β,17α,21-triol-3,20-dione, and 9α-fluoro-16α-methyl-1,4,6-pregnatriene-11β,17α,21-triol-3,20-dione with formaldehyde and concentrated hydrochloric acid in chloroform and isolate the resultant respective products in the manner described to give, respectively, 17α,20;20,21-bis-methylenedioxy-1,4,6-pregnatriene-11β-ol-3-one, 9α - fluoro-17α,20;20,21-bis-methylenedioxy-1,4,6-pregnatriene - 11β - ol-3-one, and 9α-fluoro-16α-methyl-17α,20;20,21-bis-methylenedioxy-1,4,6-pregnatriene-11β-ol-3-one.

In a manner similar to that described in Example 1A, esterify each of the 11β-hydroxy-bis-methylenedioxy derivatives prepared above with nitrosyl chloride in pyridine and isolate the resultant respective products in the manner described to give, respectively, 17α,20;20,21-bis-methylenedioxy-1,4,6-pregnatriene-11β-ol-3-one 11 - nitrite, 9α-fluoro-17α,20;20,21-bis - methylenedioxy - 1,4,6 - pregnatriene-11β-ol-3-one 11-nitrite, and 9α-fluoro-16α-methyl-17α,20;20,21 - bis - methylenedioxy - 1,4,6 - pregnatriene-11β-ol-3-one 11-nitrite.

In a manner similar to that described in Example 1B, irradiate a toluene solution of each of the 11-nitrite esters prepared in the preceding paragraph by means of a Hanovia 500 watt mercury arc lamp. Isolate the respective resultant products in the described manner to obtain, respectively, 18-oximino-17α,20;20,21-bis-methylenedioxy-1,4,6-pregnatriene-11β-ol-3-one, 9α - fluoro - 18-oximino-17α,20;20,21-bis-methylenedioxy-1,4,6 - pregnatriene-11β-ol-3-one, and 9α-fluoro-16α-methyl-18-oximino-17α,20;20, 21-bis-methylenedioxy-1,4,6-pregnatriene-11β-ol-3one.

B. *11β,18 - oxido - 18,21 - mono-methylenedioxy-1,4,6-pregnatriene-17α-ol-3,20-diones.*—In a manner similar to that described in Example 1C, treat each of the 18-oximino derivatives prepared in Example 10A with aqueous sodium nitrite in acetic acid and isolate the resultant respective products in a manner similar to that described to obtain, respectively, 11β,18-oxido-18,21-mono-methylenedioxy-1,4,6-pregnatriene-17α-ol-3,20-dione, 9α - fluoro-11β,18-oxido-18,21-mono-methylenedioxy - 1,4,6 - pregnatriene-17α-ol-3,20-dione, and 9α - fluoro-16α-methyl-11β, 18-oxido-18,21-mono-methylenedioxy-1,4,6 - pregnatriene-173,2017y 11

C. *11β,18;18,21-bis-oxido-1,4,6 - pregnatriene-17α-ol-3, 20-diones.*—(1) In a manner similar to that described in Example 1D, treat 11β,18-oxido-18,21-mono-methylenedioxy-1,4,6-pregnatriene-17α - ol - 3,20 - dione in aqueous dioxan at 0° C. with concentrated sulfuric acid. Isolate the resultant product in the described manner to give 11β, 18;18,21-bis-oxido-1,4,6-pregnatriene-17α-ol-3,20-dione.

(2) In a manner similar to that described in Example 5D, treat each of 9α-fluoro-11β,18-oxido-18,21-mono-methylenedioxy-1,4,6-pregnatriene-17α-ol-3,20-dione and 9α - fluoro - 16α - methyl - 11β,18 - oxido - 18,21 - mono-methylenedioxy - 1,4,6 - pregnatriene - 17α - ol - 3,20 - dione in glacial acetic acid and acetic anhydride at 20° C. under nitrogen with 47% aqueous hydriodic acid. Isolate the resultant respective products in a manner similar to that described to obtain, respectively, 9α-fluoro-11β,18; 18,21-bis-oxido-1,4,6-pregnatriene-17α-ol-3,20-dione and 9α - fluoro - 16α - methyl - 11β,18;18,21 - bis - oxido - 1,4, 6-pregnatriene-17α-ol-3,20-dione.

D. *11β,18 - oxido - 1,4,6 - pregnatriene - 17α,18,21-triol-3,20-dione triacetates.*—In a manner similar to that described in Example 1E, treat each of the 11β,18;18,21-bis-oxido derivatives prepared in Example 10C with 70% aqueous perchloric acid in acetic acid and acetic anhydride at 5° C. Isolate the resultant respective products in the manner described to obtain, respectively, 11β,18-oxido-1,4,6-pregnatriene-17α,18,21-triol-3,20-dione triacetate, 9α-fluoro-11β,18-oxido-1,4,6-pregnatriene-17α,18,21-triol-3,20-dione triacetate, and 9α-fluoro-16α-methyl-11β, 18-oxido-1,4,6-pregnatriene-17α,18,21-triol-3,20-dione triacetate.

E. *11β,18 - oxido - 1,4,6 - pregnatriene - 17α,18,21-triol-3,20-diones.*—In a manner similar to that described in Example 1F, hydrolyze each of the triacetate ester derivatives prepared in Example 10D in methanol at 0° C. with aqueous sodium hydroxide. Isolate the resultant respective products in the manner described to obtain, respectively, 11β,18 - oxido - 1,4,6 - pregnatriene - 17α,18, 21 - triol - 3,20 - dione, 9α - fluoro - 11β,18 - oxido - 1,4,6-pregnatriene-17α,18,21-triol-3,20-dione, and 9α-fluoro-16α - methyl - 11β,18 - oxido - 1,4,6 - pregnatriene - 17α, 18,21-triol-3,20-dione.

*Example 11.—[3,2-c]-pyrazoles of 17α-hydroxyaldosterones*

A. *16α - methyl - 18 - oximino - 17α,20;20,21 - bis-methylenedioxy - 4 - pregnene - 11β - ol - [3,2-c] - pyrazoles.*—In a manner similar to that described in Example 1A, esterify each of 9α-fluoro-16α-methyl-17α,20;20,21-bis - methylenedioxy - 4 - pregnene - 11β - ol - [3,2-c] - 2′-p - fluorophenylpyrazole, 16α - methyl - 17α,20;20,21 - bis-methylenedioxy - 4 - pregnene - 11β - ol - [3,2-c] - 2′ - p-fluorophenylpyrazole, 16α - methyl - 17α,20;20,21 - bis-methylenedioxy - 4 - pregnene - 11β - ol - [3,2-c] - 2′-phenylpyrazole, 16α - methyl - 17α,20;20,21 - bis - methylenedioxy - 4 - pregnene - 11β - ol - [3,2-c] - 1′ - phenylpyrazole, 6,16α - dimethyl -17α,20;20,21 - bis - methylenedioxy - 4,6 - pregnadiene - 11β - ol - [3,2-c] - 2′ - phenylpyrazole, 6,16α - dimethyl - 9α - fluoro - 17α,20;20,21 - bis-methylenedioxy - 4,6 - pregnadiene - 11β - ol - [3,2-c] - 2′-phenylpyrazole, and 6,16α - dimethyl - 17α,20;20,21 - bis-methylenedioxy - 4,6 - pregnadiene - 11β - ol - [3,2-c] - 2′-p-fluorophenylpyrazole with nitrosyl chloride in pyridine and isolate the resultant respective products in a manner similar to that described to yield, respectively, 9α-fluoro-16α - methyl - 17α,20;20,21 - bis - methylenedioxy - 4- pregnene - 11β - ol - [3,2-c] - 2' - p - fluorophenylpyrazole 11 - nitrite, 16α - methyl - 17α,20;20,21 - bis - methylenedioxy - 4 - pregnene - 11β - ol [3,2-c] - 2' - p - fluorophenylpyrazole 11 - nitrite, 16α - methyl - 17α,20;20,21 - bis-methylenedioxy - 4 - pregnene - 11β - ol - [3,2-c] - 2'-phenylpyrazole 11-nitrite, 16α - methyl - 17α,20;20,21-bis - methylenedioxy - 4 - pregnene - 11β - ol - [3,2-c] - 1'-phenylpyrazole 11 - nitrite, 6,16α - dimethyl - 17α,20;20,21 - bis - methylenedioxy - 4,6 - pregnadiene - 11β - ol-[3,2-c]-2' - phenylpyrazole 11 - nitrite, 6,16α - dimethyl 9α - fluoro - 17α,20;20,21 - bis - methylenedioxy - 4,6-pregnadiene - 11β - ol - [3,2-c] - 2' - phenylpyrazole 11-nitrite, and 6,16α - dimethyl - 17α,20;20,21 - bis - methylenedioxy - 4,6 - pregnadiene - 11β - ol - [3,2-c] - 2' - p-fluorophenylpyrazole 11 - nitrite.

In a manner similar to that described in Example 1B, irradiate a toluene solution of each of the 11-nitrite esters prepared in the preceding paragraph with ultraviolet light from a 500 watt Hanovia mercury arc lamp and isolate the resultant respective products in a manner similar to that described to yield, respectively, 9α-fluoro-16α-methyl-17α,20;20,21 - bis - methylenedioxy - 18 - oximino - 4-pregnene - 11β - ol - [3,2-c] - 2' - p - fluorophenylpyrazole, 16α - methyl - 17α,20;20,21 - bis - methylenedioxy-18-oximino - 4 - pregnene - 11β - ol - [3,2-c] - 2' - p - fluorophenylpyrazole, 16α - methyl - 17α,20;20,21 - bis-methylenedioxy - 18 - oximino - 4 - pregnene - 11β - ol-[3,2-c] - 2' - phenylpyrazole, 16α - methyl - 17α,20;20,21-bis - methylenedioxy - 18 - oximino - 4 - pregnene - 11β-ol - [3,2-c] - 1' - phenylpyrazole, 6,16α - dimethyl - 17α, 20;20,21 - bis - methylenedioxy - 18 - oximino - 4,6 - pregnadiene - 11β - ol - [3,2-c] - 2' - phenylpyrazole, 6,16α-dimethyl - 9α - fluoro - 17α,20;20,21 - bis - methylenedioxy - 18 - oximino - 4,6 - pregnadiene - 11β - ol - [3,2-c]-2' - phenylpyrazole, and 6,16α - dimethyl - 17α,20;20,21-bis - methylenedioxy - 18 - oximino - 4,6 - pregnadiene-11β - ol - [3,2-c] - 2' - p - fluorophenylpyrazole.

B. *11β,18 - oxido - 18,21 - mono - methylenedioxy - 4-pregnene - 17α - ol - 20 - one - [3,2-c] - pyrazoles.*—In a manner similar to that described in Example 1C, treat each of the 18-oximino derivatives prepared in Example 11A with aqueous sodium nitrite in acetic acid. Isolate the resultant respective products in a manner similar to that described to obtain, respectively, 9α-fluoro-16α-methyl - 11β,18 - oxido - 18,21 - mono - methylenedioxy - 4-pregnene - 17α - ol - 20 - one - [3,2-c] - 2' - p - fluorophenylpyrazole, 16α - methyl - 11β,18 - oxido - 18,21-mono - methylenedioxy - 4 - pregnene - 17α - ol - 20 - one-[3,2-c] - 2' - p - fluorophenylpyrazole, 16α - methyl - 11β, 18 - oxido - 18,21 - mono - methylenedioxy - 4 - pregnene-17α - phenylpyrazole, 16α - methyl - 11β,18 - oxido - 18, 21 - mono - methylenedioxy - 4 - pregnene - 7α - ol - 20-one - [3,2-c] - 1' - phenylpyrazole, 6,16α - dimethyl - 11β, 18 - oxido - 18,21 - mono - methylenedioxy - 4,6 - pregnadiene - 17α - ol - 20 - one - [3,2-c] - 2' - phenylpyrazole, 6,16α - dimethyl - 9α - fluoro - 11β,18 - oxido - 18,21-mono - methylenedioxy 4,6 - pregnadiene - 17α - ol - 20-one - [3,2-c] - 2' - phenylpyrazole, and 6,16α - dimethyl-11β,18 - oxido - 18,21 - mono - methylenedioxy - 4,6 - pregnadiene - 17α - ol - 20 - one - [3,2-c] - 2' - p - fluorophenylpyrazole.

C. *11β,18;18,21 - bis - oxido - 4 - pregnene - 17α - ol-20 - one - [3,2-c] - pyrazoles.*—(1) In a manner similar to that described in Example 5D, treat each of 9α-fluoro-16α - methyl - 11β,18 - oxido - 18,21 - mono - methylenedioxy - 4 - pregnene - 17α - ol - 20 - one - [3,20-c] - 2' - p-fluorophenylpyrazole and 6,16α - dimethyl - 9α -fluoro-11β,18 - oxido - 18,21 - mono - methylenedioxy - 4,6 - pregnadiene - 17α - ol - 20 - one - [3,2-c] - 2' - phenylpyrazole in acetic acid and acetic anhydride with 47% aqueous hydriodic acid. Isolate and purify the resultant respective products in a manner similar to that described to yield 9α - fluoro - 16α - methyl - 11β,18;18,21 - bis - oxido - 4-pregnene - 17α - ol - 20 - one - [3,2-c] - 2' - p - fluorophenylpyrazole and 6,16α - dimethyl - 9α - fluoro - 11β,18;18, 21 - bis - oxido - 4,6 - pregnadiene - 17α - ol - 20 - one-[3,2-c] - 2' - phenylpyrazole, respectively.

(2) In a manner similar to that described in Example 1D, treat each of 16α-methyl-11β,18-oxido-18,21-mono-methylenedioxy-4-pregnene-17α-ol-20-one - [3,2-c] - 2'-p-fluorophenylpyrazole, 6α-methyl - 11β,18 - oxido - 18,21-mono-methylenedioxy-4-pregnene-17α-ol-20-one - [3,2-c]-2'-phenylpyrazole, 16α-methyl-11β,18-oxido-18,21-mono-methylenedioxy-4-pregnene-17α-ol - 20 - one - [3,2-c]-1'-phenylpyrazole, 6,16α-dimethyl - 11β,18 - oxido - 18,21-mono-methylenedioxy-4,6-pregnadiene-17α-ol-20 - one-[3, 2-c]-2'-phenylpyrazole, and 6,16α-dimethyl-11β,18-oxido-18,21-mono-methylenedioxy-4,6-pregnadiene-17α - ol - 20-one-[3,2-c]-2'-p-fluorophenylpyrazole in aqueous dioxan with concentrated sulfuric acid. Isolate the resultant respective products in a manner similar to that described to yield 16α-methyl-11β,18;18,21-bis-oxido - 4 - pregnene-17α-ol-20-one-[3,2-c] - 2' - p-fluorophenylpyrazole, 16α-methyl-11β-18;18,21-bis-oxido-4-pregnene-17α-ol-20 - one-[3,2-c]-2'-phenylpyrazole, 16α-methyl-11β,18;18,21 - bis-oxido-4-pregnene-17α-ol-20-one-[3,2-c] - 1' - phenylpyrazole, 6,16α-dimethyl-11β,18;18,21-bis-oxido - 4,6 - pregnadiene-17α-ol-20-one-[3,2-c]-2'-phenylpyrazole, and 6,16α-dimethyl-11β,18;18,21-bis-oxido-4,6 - pregnadiene-17α-ol-20-one-[3,2-c]-2'-p-fluorophenylpyrazole.

D. *16α-methyl-17α-hydroxyaldosterones - [3,2-c]-pyrazoles.*—In a manner similar to that described in Example 1E, treat each of the 11β,18;18,21-bis-oxido derivatives prepared in Example 11C with aqueous perchloric acid in acetic acid and acetic anhydride. Isolate the resultant respective products in a manner similar to that described to yield, respectively, 9α-fluoro-16α-methyl-11β,18-oxido-4-pregnene-17α,18,21-triol-20-one - [3,2-c] - 2'-p - fluorophenylpyrazole triacetate, 16α-methyl-11β,18 - oxido - 4-pregnene-17α,18,21-triol-20-one-[3,2-c]-2'-p - fluorophenylpyrazole triacetate, 16α-methyl - 11β,18-oxido-4-pregnene-17α,18,21-triol-20-one-[3,2-c]-2'-phenylpyrazole triacetate, 16α-methyl-11β,18-oxido-4-pregnene - 17α,18,21-triol-20-one-[3,2-c]-1'-phenylpyrazole triacetate, 6,16α-dimethyl-11β,18-oxido-4,6-pregnadiene - 17α,18,21-triol-20-one-[3,2-c]-2'-phenylpyrazole triacetate, 6,16α-dimethyl-9α-fluoro-11β,18-oxido - 4,6 - pregnadiene-17α,18,21-triol-20-one-[3,2-c]-2'-phenylpyrazole triacetate, and 6,16α-dimethyl-11β,18-oxido-4,6-pregnadiene-17α,18,21 - triol-20-one-[3,2-c]-2'-p-fluorophenylpyrazole triacetate.

Hydrolyze each of the triacetate ester derivatives prepared in the preceding paragraph in methanol at 0° C. with aqueous sodium hydroxide in a manner similar to that described in Example 1F, and isolate the resultant respective products in a manner similar to that described to yield, respectively, 9α-fluoro-16α-methyl-11β,18-oxido-4-pregnene - 17α,18,21-triol-20-one - [3,2-c] - 2'-p-fluorophenylpyrazole, 16α-methyl-11β,18-oxido-4-pregnene-17α-18,21-triol-20-one-[3,2-c]-2'-p - fluorophenylpyrazole, 16α-methyl-11β-18-oxido-4-pregnene-17α,18,21-triol - 20 - one-[3,2-c]-2'-phenylpyrazole, 16α-methyl - 11β,18 - oxido-4-pregnene-17α,18,21-triol-20-one - [3,2-c] - 1'-phenylpyrazole, 6,16α-dimethyl-11β,18-oxido-4,6 - pregnadiene - 17α, 18,21-triol-20-one-[3,2-c] - 2' - phenylpyrazole, 6,16α-dimethyl-9α-fluoro-11β,18-oxido-4,6-pregnadiene-17α,18,21-triol-20-one-[3,2-c]-2'-phenylpyrazole, and 6,16α-dimethyl-11β,18-oxido-4,6-pregnadiene-17α,18,21-triol - 20 - one-[3,2-c]-2'-p-fluorophenylpyrazole.

*Example 12.—6-dehydro-17α-hydroxyaldosterones*

By going through a series of reactions similar to those described in Example 10, i.e., procedures 10A through 10E, 6-dehydro-hydrocortisone and 6,16α-dimethyl-6-dehydro-hydrocortisone are reacted with formaldehyde and hydrochloric acid in chloroform to yield 17α,20;20-21-bis-methylenedioxy-4,6-pregnadiene-11β-ol-3-one and 6,16α-dimethyl-17α,20;20,21-bis-methylenedioxy-4,6 - pregnadiene-11β-ol-3-one, respectively, which are then esterified with nitrosyl chloride in pyridine to give the corresponding 11-nitrite esters, i.e., 17α,20;20,21-bis-methylenedioxy- 4,6-pregnadiene-11β-ol-3-one 11-nitrite and 6,16α-dimethyl-17α,20;20,21-bis-methylenedioxy-4,6-pregnadiene - 11β-ol-3-one 11-nitrite. Irradiation of each of the aforementioned nitrite esters in toluene yields 17α,20;20,21-bis-methylenedioxy-18-oximino-4,6 -pregnadiene-11β-ol-3-one and 6,16α-dimethyl-17α,20;20,21-bis-methylenedioxy - 18-oximino-4,6-pregnadiene-11β-ol-3-one, respectively, each of which, upon treatment with nitrous acid, are converted to 11β,18-oxido-18,21-mono-methylene-dioxy-4,6-pregnadiene-17α-ol-3,20-dione and 6,16α-dimethyl-11β,18-oxido-18,21mono-methylenedioxy-17α-ol-3,20-dione, respectively. Treatment of each of the 11β,18-oxido-18,21-mono-methylenedioxy derivatives with concentrated sulfuric acid in aqueous dioxan at 0° C. yields 11β,18;18,21-bis-oxido-4,6-pregnadiene - 17α - ol - 3,20-dione and 6,16α-dimethyl-11β,18;18,21-bis-oxido-4,6-pregnadiene - 17α-ol-3,20-dione, respectively. Treatment of each of the bis-oxido derivatives with 70% aqueous perchloric acid in acetic acid/acetic anhydride at 5° C. yields 11β,18-oxido-4,6-pregnadiene-17α,18,21-triol-3,20-dione triacetate and 6,16α-dimethyl-11β-18-oxido-4,6-pregnadiene - 17α,18,21-triol-3,20-dione triacetate, respectively, which are hydrolyzed in methanol with aqueous sodium hydroxide to yield 11β,18-oxido-4,6-pregnadiene-17α,18,21-triol-3,20 - dione and 6,16α-dimethyl-11β,18-oxido-4,6-pregnadiene-17α,18,21-triol-3,20-dione, respectively.

*Example 13.—Alternate procedures for the preparation of 17α-hydroxyaldosterones*

A. Treat hydrocortisone 21-acetate with nitrosyl chloride in pyridine in a manner similar to that described in Example 1A to give hydrocortisone 11-nitrite 21-acetate.

In a manner similar to that described in Example 1B, dissolve hydrocortisone 11-nitrite 21-acetate in toluene and irradiate the toluene solution with ultraviolet light and isolate the resultant product in a manner similar to that described to give 18-oximino-hydrocortisone 21-acetate.

React 18-oximino-hydrocortisone 21-acetate with 5% aqueous sodium nitrite in acetic acid in the manner described in Example 1C. Purify the resultant product by extracting the reaction mixture several times with methylene chloride, wash the combined extracts with aqueous sodium bicarbonate, dry over sodium sulfate, and evaporate in vacuo to a residue of substantially 17α-hydroxy-aldosterone. Purify by crystallization from ethyl acetate-methanol.

B. The requisite intermediate, 3,20-bis-ethylenedioxy-5-pregnene-11β,17α,21-triol 11-nitrite 21-acetate, is prepared from 3,20-bis-ethylenedioxy-5-pregnene - 11β,17α-21-triol 21-acetate by reaction with nitrosyl chloride in pyridine in a manner similar to that described in Example 1A.

Irradiate a solution of 10 g. of 3,20-bis-ethylendioxy-5-pregnene-11β,17α,21-triol 11-nitrite 21-acetate in 130 ml. of benzene at 10°C. under nitrogen for 90 minutes in a manner similar to that described in Example 1B. Evaporate the benzene in vacuo and triturate the resultant residue with acetone to give 3,20-bis-ethylenedioxy-18-oximino-5-pregnene-11β,17α,21-triol 21-acetate. Purify by recrystallization from acetone.

To 200 mg. of 3,20-bis-ethylendioxy-18-oximino-5-pregnene-11β,17α,21-triol 21-acetate in 13 ml. of glacial acetic acid, add 6.5 ml. of 5% aqueous sodium nitrite at room temperature. Allow the solution to stand at room temperature for 15 minutes; then pour into water and extract with methylene chloride. Wash the combined methylene chloride extracts with aqueous sodium bicarbonate, dry over sodium sulfate, and evaporate in vacuo to a residue of substantially 3,20-bis-ethylenedioxy-11β, 18-oxido-5-pregnene-17α,18,21-triol 21-acetate. Purify by crystallization from ethyl acetate-hexane.

To 300 mg. of 3,20-bis-ethylenedioxy-11β,18-oxido-5-pregnene-17α,18,21-triol 21-acetate in 18 ml. of dioxan containing 42 ml. of water add 3.6 ml. of concentrated sulfuric acid and heat the reaction mixture under nitrogen on a steam bath for 1¾ hours. Add water to the reaction mixture, extract with methylene chloride, then distill the combined methylene chloride fractions to a residue of substantially 11β,18;18,21-bis-oxido-4-pregnene-17α-ol-3,20-dione (the compound of Example 4E). Purify by crystallization from ethyl acetate.

Reaction of the bis-oxido derivative prepared in the preceding paragraph in the manner described in Examples 4F and 4G will yield 17α-hydroxyaldosterone.

*Example 14*

The 11β,18-oxido-18,21-mono-methylene-17α-hydroxy-4-pregnene intermediates of Formula IV of this invention, in addition to being valuable as intermediates in preparing the 11β,18-oxido-17α,18-dihydroxy-4-pregnenes of Formulae I and II are also valuable as intermediates in preparing 16-bromoaldosterone and 16-dehydroaldosterone derivatives. Thus, 9α-fluoro-16α-methyl-11β,18-oxido - 18,21 - mono-methylenedioxy-1,4-pregnadiene in acetic acid, upon treatment with hydrogen bromide yields the 16α-bromo-17-desoxy derivative 9α-fluoro-16α-bromo-16β - methyl - 11β,18-oxido-1,4-pregnadiene-18,21-diol-3,20-dione diacetate which is dehydrobrominated in refluxing pyridine to yield 9α-fluoro-16-methyl-11β,18-oxido-1,4,16-pregnatriene-18,21-diol-3,20-dione diacetate.

The 16-bromo- and 16-dehydroaldosterone derivatives such as those described below have minimal sodium retaining properties, are valuable as anti-aldosterone agents, and are valuable as intermediates in preparing other therapeutically valuable derivatives.

A. *9α-fluoro-16α-bromo-11β,18-oxido-16β-methyl-1,4-pregnadiene 18,21-diol-3,20-dione diacetate.*—To 2.4 g. of 9α-fluoro-16α-methyl-11β,18-oxido-18,21-mono-methylenedioxy-1,4-pregnadiene-17α-ol-3,20-dione (the compound of Example 5C) dissolved in 74 ml. of glacial acetic acid at room temperature, and dropwise a solution of 28 g. of gaseous hydrogen bromide in 94 g. of glacial acetic acid over a period of 1¾ hours. Evaporate the reaction mixture to a residue; then dissolve the residue in methylene chloride and chromatograph over Florisil. Combine the like fractions and evaporate to a residue comprising 9α-fluoro-16α-bromo-11β,18-oxido-16β-methyl-1,4-pregnadiene-18,21-diol-3,20-dione diacetate.

In a similar manner, 11β,18-oxido-18-21-mono-methylene- dioxy-1,4-pregnadiene-17α-ol-3,20-dione, 9α-fluoro-11β,18 - oxido - 18,21-mono-methylenedioxy-4-pregnene-17α - ol-3,20-dione, 9α-fluoro-11β,18-oxido-18,21-mono-methylenedioxy-1,4-pregnadiene-17α-ol-3,20-dione, 11β, 18 - oxido - 18,21-mono-methylenedioxy-4-pregnene-17α-ol-3,20-dione, 9α-bromo-11β,18-oxido-18,21-mono-methylenedioxy-4-pregnene-17α-ol-3,20-dione, and 16α-methyl - 11β,18-oxido-18,21-mono-methylenedioxy-1,4,6-pregnatriene-17α-ol-3,20-dione (the compounds of Examples 1C, 2C, 3A, 4D, 7C, and 10B, respectively) upon reaction with hydrogen bromide in acetic acid in the above-described manner are each converted to 16α-bromo-11β, 18 - oxido-1,4-pregnadiene-18,21-diol-3,20-dione diacetate, 9α-fluoro-16α-bromo-11β,18-oxido-4-pregnene-18,21-diol-3,20-dione diacetate, 9α-fluoro-16α-bromo-11β,18-oxido - 1,4-pregnadiene-18,21-diol-3,20-dione diacetate, 16α - bromo - 11β,18-oxido-4-pregnene-18,21-diol-3,20-dione diacetate, 9α,16α-dibromo-11β,18-oxido-4-pregnene-18,21-diol-3,20-dione diacetate, and 16α-bromo-16β-methyl - 11β,18-oxido-1,4,6-pregnatriene-18,21-diol-3,20-dione diacetate, respectively.

B. *9α-fluoro-11β,18-oxido-16-methyl-1,4,16-pregnatriene-18,21-diol-3,20-dione diacetate.*—Add 82 mg. of 9α-fluoro - 16α-bromo-11β,18-oxido-16β-methyl-1,4-pregnadiene-18,21-diol-3,20-dione diacetate to 2.5 ml. of pyridine and reflux the solution for 40 minutes. Chromatograph the resultant product over 2 g. of alumina in methylene dichloride containing 1% methanol. Evaporate the eluate in vacuo to a residue comprising 9α-fluoro-11β,18-oxido - 16-methyl-1,4,16-pregnatriene-18,21-diol-3,20-dione diacetate. Purify by crystallization from acetone-hexane.

In a similar manner, treat each of the 16α-bromo derivatives prepared in Example 14A in refluxing pyridine and isolate the resultant products in the described manner to give, respectively, 11β,18-oxido-1,4,16-pregnatriene-18,21-diol-3,20-dione diacetate, 9α-fluoro-11β,18-oxido-4,16-pregnadiene-18,21-diol-3,20-dione diacetate, 9α-fluoro-11β,18-oxido-1,4,16-pregnatriene-18,2-diol-3,20-dione diacetate, 11β,18 - oxido-4,16-pregnadiene-18,21-diol-3,20-dione diacetate, 9α-bromo-11β,18-oxido-4,16-pregnadiene-18,21-diol-3,20-dione diacetate, and 11β,18-oxido-16-methyl-1,4,6,16 - pregnatetraene-18,21-diol-3,20-dione diacetate.

I claim:

1. A member selected from the group consisting of a [3,2-c]-pyrazole derivative of a 17α-hydroxyaldosterone of the following formula and the 6-dehydro analogs thereof:

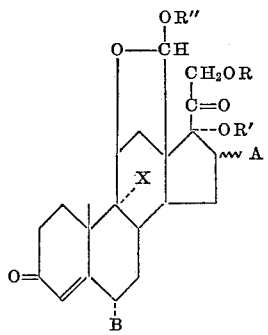

wherein A is a member selected from the group consisting of hydrogen and lower alkyl; B is a member selected from the group consisting of hydrogen, methyl, and fluorine; X is a member selected from the group consisting of hydrogen and halogen; and R, R', and R" are members selected from the group consisting of hydrogen and lower alkanoyl; wherein said [3,2-c]-pyrazole derivative is a member selected from the group consisting of [3,2-c] - 2' - p - fluorophenylpyrazole, [3,2-c]-2'-phenylpyrazole and [3,2-c]-1'-phenylpyrazole.

2. 9α - fluoro - 11β,18 - oxido - 16α - methyl - 4 - pregnene - 17α,18,21 - triol - 3,20 - dione - [3,2-c] - 2' - p - fluorophenylpyrazole.

3. 9α - fluoro - 11β,18 - oxido - 16α - methyl - 1,4-pregnadiene-17α,18,21-triol-3,20-dione.

4. 9α - fluoro - 11β,18 - oxido - 16α - methyl - 1,4-pregnadiene-17α,18,21-triol-3,20-dione triacetate.

5. A compound selected from the group consisting of 18,21-mono-methylenedioxy-4-pregnenes of the following formula, the 1-dehydro, 6-dehydro, and 1,6-bis-dehydro analogs, the [3,2-c]-pyrazole derivatives thereof of the group consisting of [3,2-c]-2'-p-fluorophenylpyrazole, [3,2-c]-2'-phenylpyrazole, and [3,2-c]-1'-phenylpyrazole, and the 6-dehydro analogs of said [3,2-c]-pyrazole derivatives thereof:

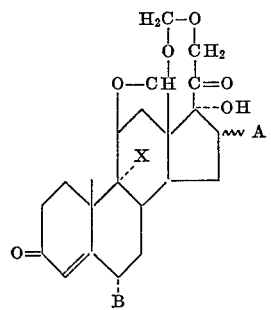

wherein A is a member selected from the group consisting of hydrogen and lower alkyl; B is a member selected from the group consisting of hydrogen, methyl, and fluorine; and X is a member selected from the group consisting of hydrogen and halogen.

6. A compound selected from the group consisting of an 18,21-oxido-4-pregnene of the following structural formula, the 1-dehydro, 6-dehydro, and 1,6-bis-dehydro analogs, the [3,2-c]-pyrazole derivatives thereof of the group consisting of [3,2-c]-2'-p-fluorophenylpyrazole, [3,2-c]-2'-phenylpyrazole; and [3,2-c]-1'-phenylpyrazole, and the 6-dehydro analogs of said [3,2-c]-pyrazole derivatives thereof:

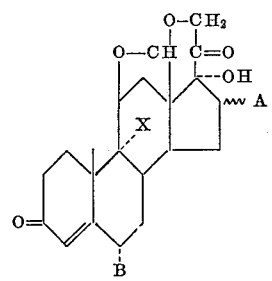

wherein A is a member selected from the group consisting of hydrogen and lower alkyl; B is a member selected from the group consisting of hydrogen, methyl, and fluorine; and X is a member selected from the group consisting of hydrogen and halogen.

7. A compound selected from the group consisting of 18-oximino derivatives of the following structural formula, the 1-dehydro, 6-dehydro, and 1,6-bis-dehydro analogs, and the [3,2-c]-pyrazole derivatives thereof of the group consisting of [3,2-c]-2'-p-fluorophenylpyrazole, [3,2-c]-2'-phenylpyrazole, and [3,2-c]-1'-phenylpyrazole, and the 6-dehydro analogs of said [3,2-c]-pyrazole derivatives thereof:

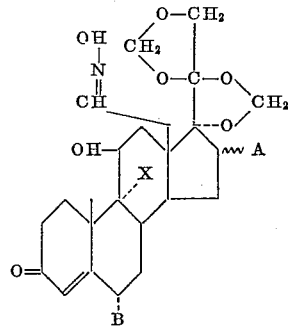

wherein A is a member selected from the group consisting of hydrogen and lower alkyl; B is a member selected from the group consisting of hydrogen, methyl, and fluorine; and X is a member selected from the group consisting of hydrogen and halogen.

8. In the process of preparing a 17α-hydroxyaldosterone the step which comprises treating with nitrous acid a member of the group consisting of the 21-lower alkanoate, the 3,20-bis-lower alkylene ketal derivatives, and the 17α,20;20,21-bis-methylenedioxy derivative of an 18-oximino-4-pregnene-11β,17α,21-triol-3,20-dione.

9. In the process of preparing 17α-hydroxyaldosterone the steps which comprise treating with nitrous acid a member of the group consisting of an 18-oximino-17α,20;20,21-bis-methylenedioxy-4-pregnene-11β-ol-3-one and a [3,2-c]-pyrazole derivative thereof, and subjecting the thereby formed intermediate of the group consisting of an 11β,18-oxido-18,21 - mono - methylenedioxy - 4 - pregnene-17α-ol-3,20-dione and a [3,2-c]-pyrazole derivative thereof to acidic hydrolysis.

10. In the process for preparing a 17α-hydroxyaldosterone, the steps which comprise treating with nitrous acid a member of the group consisting of an 18-oximino-17α,20;20,21-bis - methylenedioxy - 4 - pregnene-11β-ol-3-one and a [3,2-c]-pyrazole derivative thereof; subjecting the thereby formed intermediate of the group consisting of an 11β,18-oxido-18,21-mono-methylenedioxy-4-pregnene-17α-ol-3,20-dione and a [3,2-c]-pyrazole derivative thereof to an acidic reagent of the group consisting of sulfuric acid in aqueous dioxan and, when said 4-pregnene has a 9α-halogeno group, an acetic acid/acetic anhydride in 47% hydriodic acid mixture; reacting the thereby formed bis-oxido intermediate of the group consisting of 11β,18;18,21-bis-oxido-4-pregnene-17α-ol-3,20-dione and a [3,2-c]-pyrazole derivative thereof to a perchloric acid/alkanoic acid/alkanoic acid anhydride mixture, whereby there is formed a tri-alkanoate of the group consisting of a 17α-hydroxyaldosterone-17α,18,21-tri-alkanoate ester and a [3,2-c]-pyrazole derivative thereof.

11. The process of claim 10 including the subsequent step of subjecting said tri-alkanoate of the group consisting of a 17α-hydroxyaldosterone-17α,18,21-tri-alkanoate and a [3,2-c]-pyrazole derivative thereof to mild alkaline hydrolysis.

12. In the process for preparing a compound selected from the group consisting of 17α-hydroxyaldosterones of the following structural formula and the 1-dehydro, 6-dehydro, and 1,6-bis-dehydro analogs thereof, and the [3,2-c]-pyrazole derivatives thereof, and the 6-dehydro analogs of said [3,2-c]-pyrazole derivatives thereof:

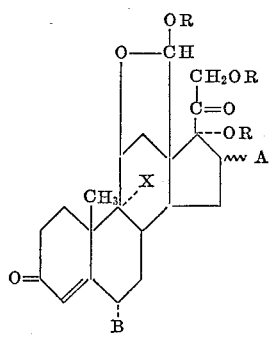

wherein A is a member selected from the group consisting of hydrogen and lower alkyl; B is a member selected from the group consisting of hydrogen, methyl, and fluorine; X is a member selected from the group consisting of hydrogen and halogen; and R, R' and R'' are members selected from the group consisting of hydrogen and lower alkanoyl; which comprises reacting with nitrous acid a compound selected from the group consisting of an 11β-hydroxy-18-oximino-4-pregnene of the following formula and the 1-dehydro, 6-dehydro, and 1,6-bis-dehydro analogs thereof, and the [3,2-c]-pyrazole derivatives thereof, and the 6-dehydro analogs of said [3,2-c]-pyrazole derivatives thereof:

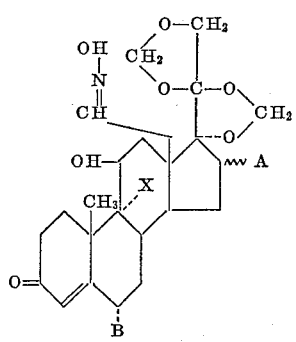

wherein A, B, and X are as above defined; subjecting the thereby formed compound selected from the group consisting of an 11β,18-oxido-18,21-mono-methylenedioxy-4-pregnene of the following formula, the 1-dehydro, 6-dehydro, and 1,6-bis-dehydro analogs thereof, and the [3,2-c]-pyrazole derivatives thereof, and the 6-dehydro analogs of said [3,2-c]-pyrazole derivatives thereof:

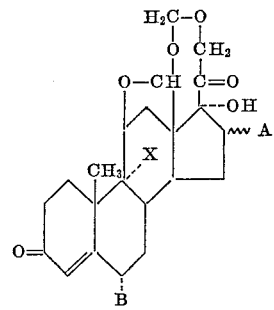

wherein A, B, and X are as above defined; to an acid reagent selected from the group consisting of sulfuric acid in aqueous dioxan and, when X is halogen, a mixture of hydriodic acid together with a lower alkanoic acid and the anhydride thereof; reacting the thereby formed compound of the group consisting of 11β,18;18,21-bis-oxido-4-pregnenes of the following formula, the 1-dehydro, 6-dehydro, and 1,6-bis-dehydro analogs, and the [3,2-c]-pyrazole derivatives thereof, and the 6-dehydro analogs of said [3,2-c]-pyrazole derivatives thereof:

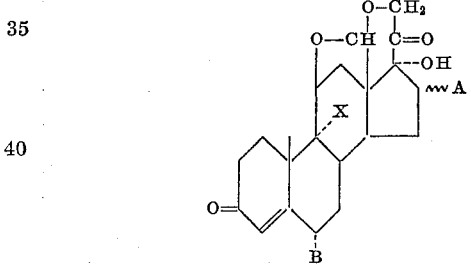

A, B, and X being as above defined, to a perchloric acid/alkanoic acid/alkanoic acid anhydride mixture, whereby is formed a compound selected from the group consisting of a 17α,18,21-tri-alkanoate of the following formula, and the 1-dehydro, 6-dehydro, and 1,6-bis-dehydro analogs, and the [3,2-c]-pyrazole derivatives thereof, and the 6-dehydro analogs of said [3,2-c]-pyrazole derivatives thereof:

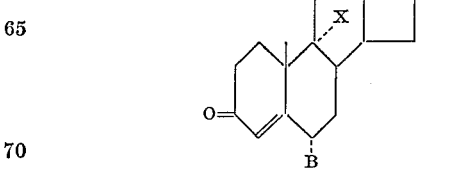

wherein A, B, and X are as above defined and R is lower alkanoyl.

13. The process for preparing a 9α-halogeno-17α-hydroxyaldosterone selected from the group consisting of compounds of the following structural formula and the 1-dehydro, 6-dehydro, and 1,6-bis-dehydro analogs, and the [3,2-c]-pyrazole derivatives thereof, and the 6-dehydro analogs of said [3,2-c]-pyrazole derivatives thereof:

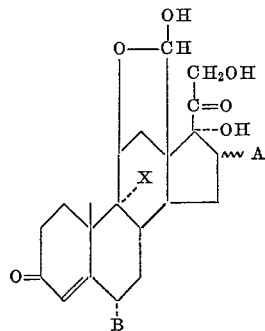

wherein A is a member selected from the group consisting of hydrogen and lower alkyl; B is a member selected from the group consisting of hydrogen, methyl, and fluorine; and X is halogen, which comprises reacting with nitrous acid a compound selected from the group consisting of 11β-hydroxy-18-oximino-4-pregnene of the following formula, and the 1-dehydro, 6-dehydro, and 1,6-bis-dehydro analogs, and the [3,2-c]-pyrazole derivatives thereof, and the 6-dehydro analogs of said [3,2-c]-pyrazole derivatives thereof:

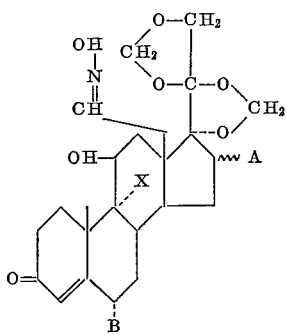

wherein A, B, and X are as above defined; and treating with sulfuric acid in aqueous dioxan at temperatures in the range of from 20–100° C. the thereby formed 11β,18-oxido-18,21-mono-methylenedioxy derivative selected from the group consisting of compounds of the following structural formula and the 1-dehydro, 6-dehydro, and 1,6-bis-dehydro analogs thereof, and the [3,2-c]-pyrazole derivatives thereof, and the 6-dehydro analogs of said [3,2-c]-pyrazole derivatives thereof:

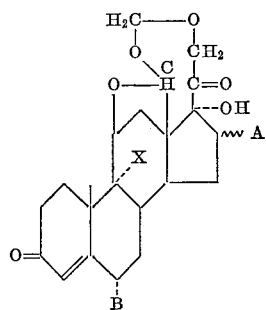

wherein A, B, and X are as above defined.

14. The process of preparing 9α-fluoro-16α-methyl-17α-hydroxy-1-dehydroaldosterone which comprises reacting 9α-fluoro-18-oximino-17α,20;20,21 - bis - methylenedioxy-1,4-pregnadiene-11β-ol-3-one with nitrous acid, and subjecting the 9α-fluoro-11β,18-oxido-18,21-mono-methylenedioxy-1,4-pregnadiene-17α-ol-3,20-dione thereby formed to the action of sulfuric acid in aqueous dioxan at temperatures in the range of 75–80° C.

References Cited by the Examiner
UNITED STATES PATENTS

| | | | |
|---|---|---|---|
| 2,882,282 | 4/59 | Agnello et al. | 260—397.3 |
| 2,948,738 | 8/60 | Reichstein et al. | 260—240.9 |
| 2,949,405 | 8/60 | Wettstein et al. | 195—51 |
| 3,000,884 | 9/61 | Wettstein et al. | 260—239.57 |

LEWIS GOTTS, *Primary Examiner.*

UNITED STATES PATENT OFFICE
CERTIFICATE OF CORRECTION

Patent No. 3,216,997            November 9, 1965

Derek H. R. Barton

It is hereby certified that error appears in the above numbered patent requiring correction and that the said Letters Patent should read as corrected below.

Column 2, line 70, below the formula, for "(Ib) and (IbI)" read -- (Ib) and (IIb) --; column 7, line 60, for "of 0.1 aqueous" read -- of 0.1 N aqueous --; column 10, line 4, for "11α,18;18,21-bis-oxido-" read -- 11β,18;18,21-bis-oxido- --; column 16, line 9, for "173,2017y 11" read -- 17α-ol-3,20-dione --; column 17, line 52, for "4-pregnene-7α-ol-" read -- 4-pregnene-17α-ol- --; column 18, line 6, for "6α-methyl-11β,18-" read -- 16α-methyl-11β,18- --; column 21, line 9, for "pregnatriene-18,2-diol" read -- pregnatriene-18,21-diol --; column 23, lines 25 to 40, the formula should appear as shown below instead of as in the patent:

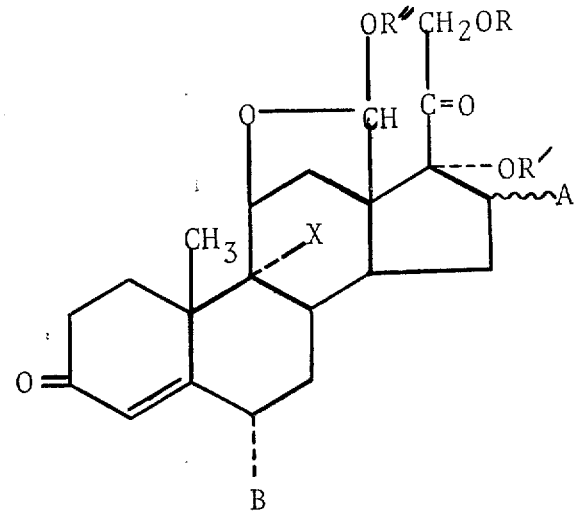

Signed and sealed this 29th day of November 1966.

(SEAL)
Attest:

ERNEST W. SWIDER            EDWARD J. BRENNER
Attesting Officer            Commissioner of Patents